United States Patent
Nishijima et al.

[11] Patent Number: 6,042,147
[45] Date of Patent: Mar. 28, 2000

[54] AIR-BAG DEVICE

[75] Inventors: Kazuyoshi Nishijima; Tetsuji Endo; Kazuhiro Kaneko; Michitaka Suzuki; Toshiyuki Sugiyama, all of Fuji, Japan

[73] Assignee: Nihon Plast Co., Ltd., Japan

[21] Appl. No.: 09/068,873

[22] PCT Filed: Sep. 30, 1997

[86] PCT No.: PCT/JP97/03491

§ 371 Date: May 20, 1998

§ 102(e) Date: May 20, 1998

[87] PCT Pub. No.: WO98/14353

PCT Pub. Date: Sep. 4, 1998

[30] Foreign Application Priority Data

Sep. 30, 1996 [JP] Japan ................................ 8-258681

[51] Int. Cl.⁷ ............................................. B60R 21/18
[52] U.S. Cl. ....................................... 280/743.1; 280/731
[58] Field of Search ........................... 280/728.1, 728.2, 280/729, 736, 740, 743.1, 743.2

[56] References Cited

U.S. PATENT DOCUMENTS

| | | |
|---|---|---|
| 3,752,501 | 8/1973 | Daniel et al. ........................ 280/731 |
| 4,828,286 | 5/1989 | Föhl ........................................ 280/731 |
| 5,186,489 | 2/1993 | Imai ..................................... 280/728.2 |
| 5,205,584 | 4/1993 | Honda ................................. 280/743.1 |
| 5,211,422 | 5/1993 | Frantz et al. ........................... 280/470 |
| 5,246,249 | 9/1993 | Satoh ..................................... 280/731 |
| 5,308,107 | 5/1994 | Watannabe et al. ................ 280/728.2 |
| 5,308,113 | 5/1994 | Moriset ............................... 280/743.1 |
| 5,350,188 | 9/1994 | Sato ..................................... 280/743.1 |
| 5,350,190 | 9/1994 | Szigethy ............................. 280/728.2 |
| 5,358,273 | 10/1994 | Onishi et al. ....................... 280/743.1 |
| 5,378,011 | 1/1995 | Rogerson et al. .................. 280/743.1 |
| 5,439,248 | 8/1995 | Steffens, Jr. et al. ............... 280/730.2 |
| 5,480,184 | 1/1996 | Young ..................................... 280/731 |
| 5,489,119 | 2/1996 | Prescaro et al. ................... 280/743.2 |
| 5,573,270 | 11/1996 | Sogi et al. ............................. 280/740 |
| 5,813,696 | 9/1998 | Hill ..................................... 280/743.2 |

*Primary Examiner*—Kevin Hurley
*Assistant Examiner*—Andrew J. Fischer
*Attorney, Agent, or Firm*—Morrison Law Firm

[57] ABSTRACT

A retainer (15) adapted to fix an air bag (14) to a base plate (11) includes an expanded portion (15b) for covering an inflator (12). An angled portion (15d) of the expanded portion (15b) is provided with radially arranged gas through holes (15f). The center portion of an upper fabric material (14a) of the air bag (14) is affixed to the center of a top plate portion (15e) of the expanded portion (15b) by means of a rivet (41), thereby limiting the distance by which the air bag (14) projects toward the occupant.

4 Claims, 19 Drawing Sheets

AIR-BAG DEVICE

TECHNICAL FIELD

The present invention relates to an air bag device including an air bag adapted to be inflated by gas flowing into the air bag.

BACKGROUND ART

Examples of conventional air bag devices include an air bag device for protecting a driver of a vehicle from a shock resulting from a collision or the like, wherein the air bag device is incorporated in the boss portion of the steering wheel of the vehicle. This air bag device is provided with an inflator for ejecting gas, a pouch-shaped air bag stored in a folded state, a cover for covering the air bag, and a base plate to which the inflator, the air bag and the cover are attached. When the air bag device having a structure as above detects a shock which may result from a collision of the vehicle, in other words when it detects sudden deceleration that exceeds a given speed reduction rate, the device ejects gas from the inflator, so that the pressure resulting from the expansion of the air bag tears the cover along a predetermined tear line and opens the cover like doors, thereby projecting the air bag from the cover and unfolding and inflating the air bag in front of the driver. In order to appropriately receive the driver and effectively absorb a shock delivered to his head and abdomen regardless of his physical features, which may vary depending on occupants, or driving postures or other seating positions, it is desired that the air bag has such inflation characteristics that the distance by which the air bag projects towards the front of the driver is limited to an extent just sufficient to receive the upper part of the body of the driver who is leaning forward and that the air bag is extended rapidly to a sufficient extent in radial directions.

An example of structures dealing with the above problems is disclosed in Japanese Patent Laid-open No. 224438-1992, which calls for attaching a catching belt to the inner surface of the side of the air bag facing the driver and connecting the belt to the container of the air bag. However, the above structure complicates the production process of the air bag device, because it requires an operation for attaching an end of the catching belt to the inner side of the air bag and another operation, when the air bag device is assembled, for attaching the other end of the catching belt to a specified portion of the container of the air bag, said portion of the container located further inside the device. In addition, it presents another problem in that the air bag tends to become excessively bulky when folded in the state where the catching belt is disposed in the air bag.

Another example of air bag devices is disclosed in Japanese Patent laid-open No. 104196-1996, which calls for providing another bag material inside the air bag and sewing one of the bag materials that constitute the air bag to said inner bag material in such a manner that a part of the bag material can be torn. However, as this configuration requires an additional bag material to be provided inside the bag materials that constitute the air bag, it complicates the sewing process. An air bag is formed into a bag usually by sewing together two bag materials along the edge and then turning the sewed materials inside out. According to the above configuration, however, the additional inner bag material is so disposed as to connect each one of two outer bag materials to the other. In other words, the process of sewing the inner bag material is a separate step from the step for sewing together the base bag materials. Therefore, said configuration presents a problem in that steps of machine sewing are increased.

As described above, the configuration which calls for disposing a catching belt in an air bag and connecting the belt to the container of the air bag presents such drawbacks as to make the production process complicated and increase the volume of the air bag in the folded state. The configuration which calls for disposing an additional bag material in an air bag and sewing a bag material of the air bag to the inner bag material in such a manner that a part of the bag material can be torn has drawbacks in that the sewing process of the air bag becomes complicated, because another bag material has to be provided inside the bag materials that constitute the air bag.

In order to solve the above problems, an object of the present invention is to provide an air bag device which is easy to be produced and has superior performance characteristics for inflating the air bag.

DISCLOSURE OF INVENTION

An air bag device according to the invention includes an inflator for ejecting gas, a pouch-shaped air bag to be expanded by gas ejected by said inflator and introduced into the air bag, and a supporting member having a fastening portion adapted to be positioned at a given location between the inflator and the air bag, wherein the air bag has a fastenable portion which is provided at a given location and fastened to said fastening portion. As the fastenable portion which is provided at a given location of the air bag is secured at a predetermined position, the above structure is capable of limiting the distance by which the air bag projects in the direction in which the fastenable portion faces and also enhancing the expansion in radial directions from the fastenable portion. Thus, according to the above configuration, the expansion characteristics of the air bag can be easily adjusted. As the air bag is fastened to the fastening portion of the supporting member that is disposed at a given location between the inflator and the air bag, the air bag can be produced more easily, and production costs can therefore be reduced, compared with a configuration which calls for disposing a belt or a cloth inside the air bag and sewing it onto the air bag.

By providing the supporting member with a gas guiding portion in order to guide gas ejected by the inflator, the directions in which gas is ejected can be adjusted. This feature, together with the feature wherein the fastenable portion is fastened, is effective in easily improving the expansion characteristics of the air bag. As the gas guiding portion is included in the supporting member that has the fastening portion, the above configuration does not increase the number of parts and is therefore capable of reducing production costs.

In addition, by forming the fastening portion as an integral body with the inflator, the structure of the air bag device can be simplified, which enables the reduction of production costs.

By providing the fastenable portion at the air bag front portion of the air bag, said air bag front portion facing the gas inlet opening from which gas is introduced into the air bag, the distance by which the air bag projects in the direction of the occupant can be limited while the air bag is inflated rapidly and flatly in radial directions so that a shock can be received over a wide area.

Furthermore, by providing the fastenable portion of the air bag at a distance from the center of the air bag front portion of the air bag in a given direction, the shape into which the air bag will be inflated can be easily adjusted so that the air bag may be inflated widely in desired directions.

By providing a fixture piece adapted to permit the fastenable portion to be fastened from the outside of the air bag to the fastening portion, the fastenable portion can be fastened to the fastening portion by means of an operation from the outside of the pouch-shaped air bag. Therefore, this configuration facilitates the production work and therefore reduces production costs compared with a structure which calls for conducting a sewing operation or the like inside the pouch-shaped air bag.

By providing the air bag with an auxiliary bag material adapted to be located at a distance from the fastenable portion and cover the fastenable portion when the air bag is inflated, the characteristics for absorbing a shock delivered from the direction of the occupant can be easily improved.

By affixing the auxiliary bag material to the air bag at a plurality of locations in such a manner that the auxiliary bag material extends across the fastenable portion, the auxiliary bag material can be stretched along with expansion of the air bag. Thus, appropriate shock absorption characteristics can be obtained by a simple configuration.

Furthermore, by providing a flexible auxiliary fitting member for connecting the fastenable portion to the fastening portion, flow of gas can be improved, or an influence of gas delivered from the supporting member to the air bag can be limited while the position of the air gas is stabilized.

BEST MODE FOR CARRYING OUT THE INVENTION

Figure 1:
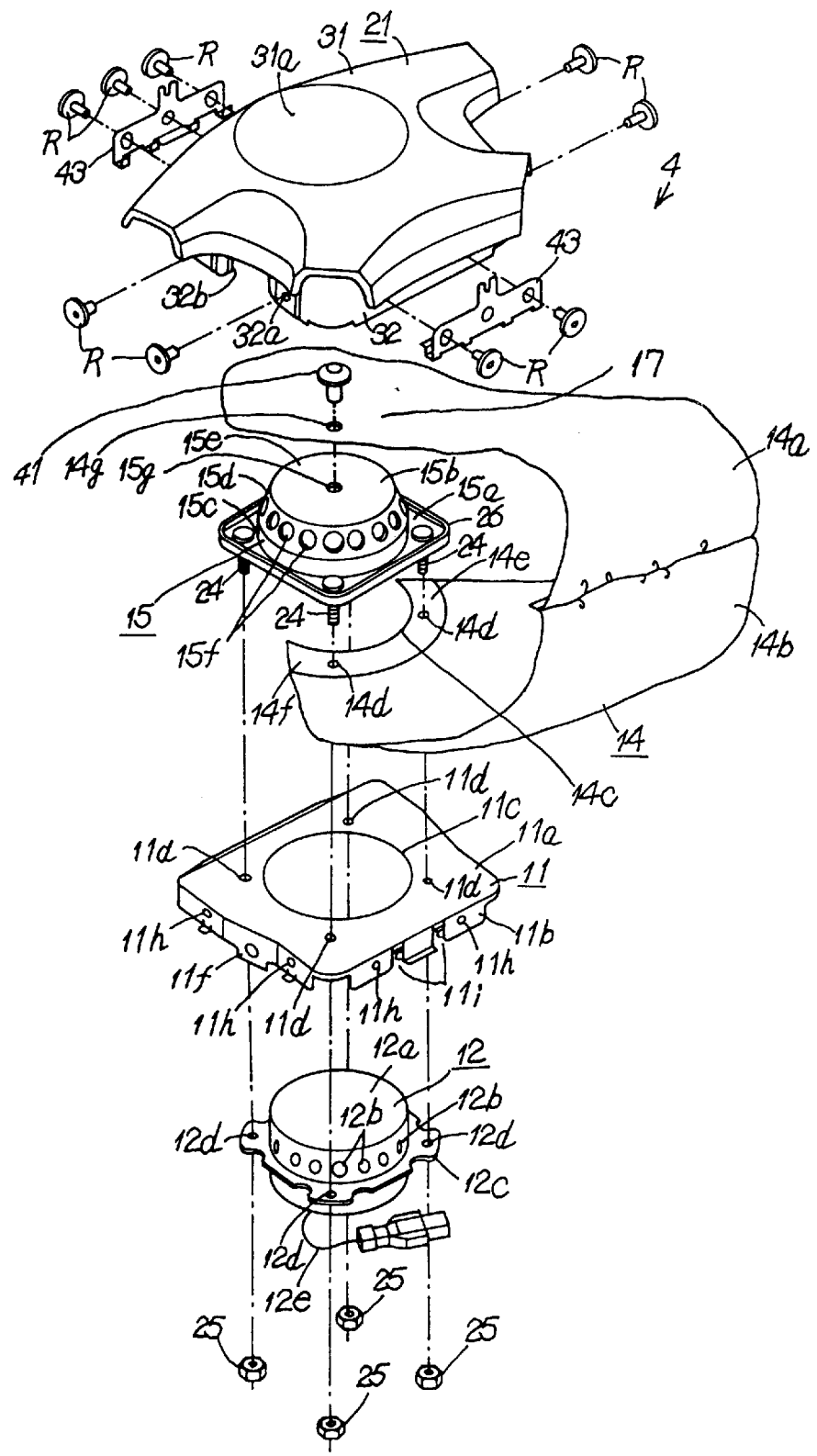
FIG. 1 is an exploded perspective of an air bag device according to a first embodiment of the present invention.

Next, an embodiment of an air bag device according to the invention is explained hereunder, referring to the drawings.

Figure 4:
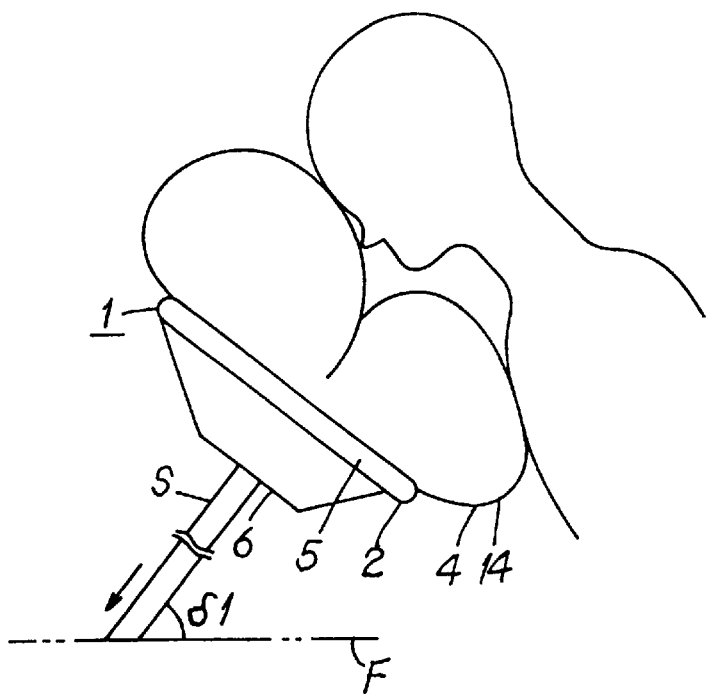
FIG. 4 is a schematic illustration to explain the operation of same.

Referring to FIG. 4, numeral 1 denotes a steering wheel of a vehicle. The steering wheel 1 comprises a steering wheel body 2 and an air bag device (an air bag module) 4 attached to the steering wheel body 2, more precisely to the side facing a passenger of the vehicle (the driver in case of this embodiment). As shown in FIG. 4, the steering wheel 1 is provided at an angled position, as it is attached to an angled steering shaft S which itself is angled. In the explanation hereunder, the front side of the air bag device 4, in other words the side facing the driver, is referred to as the upper side, while the bottom side of the air bag device 4, i. e. the side facing the body of the vehicle, is referred to as the lower side.

The steering wheel body 2 is comprised of an annular rim portion 5, a boss portion located inside the ring defined by the rim portion 5, and a plurality of spokes (not shown) which connect the rim portion and the boss portion together. In case of the present embodiment, four spokes are provided. Provided under the boss portion 6, i. e. at the end facing the body of the vehicle, is a boss to be fitted to a steering shaft S which is tilted at a predetermined angle δ1 with respect to the surface of the floor F, i. e. the horizontal plane. A boss plate is welded or otherwise integrally attached to the bass. The boss plate is connected to the core metals of the spokes, which are connected to the core metal of the rim portion 5. An outer cover made of soft foamed polyurethane resin or the like is formed over the outer surface of the core metal of the rim portion 5 and the part of the outer surface of the core metal of each spoke, i. e. the part near the rim 5. Horn plates forming a horn switch mechanism that serves as a switch are provided above the boss plate in such a manner that the horn plates can be elastically projected upward or retracted downward. The air bag device 4 is attached to and supported by the horn plates.

Figure 2:
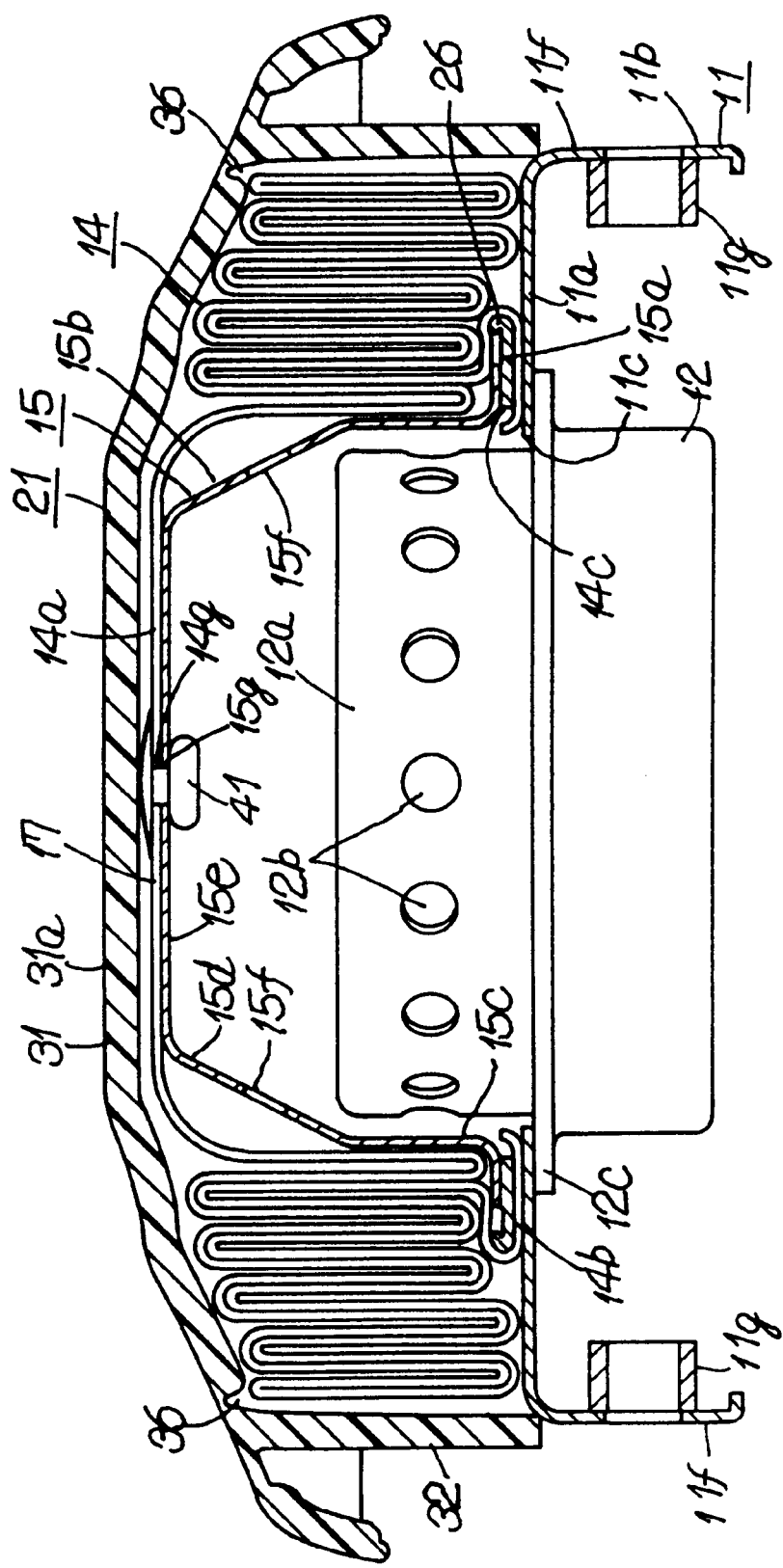
FIG. 2 is a sectional view of same.

As shown in FIGS. 1 and 2, the air bag device 4 essentially comprises a base plate 11 serving as an attachment member, an air bag 14 and an inflator 12 mounted on the base plate 11, and a retainer 15 and a cover 21 which are also attached to the base plate 11 after the air bag 14 and the inflator 12 are mounted, the retainer 15 serving as a supporting member.

The base plate 11 is formed by bending a steel plate so that the base plate 11 consists of a generally rectangular flat top plate portion 11a and a side wall portion 11b in the shape of an approximately rectangular tube extending downward from the peripheral edge of the top plate portion 11a. The top plate portion 11a is provided at its center with a circular hole, i. e. an inflator mounting hole 11c adapted to fit the inflator, and a plurality of bolt through holes 11d which are provided around the inflator mounting hole 11c. The side wall portion 11b has a pair of opposingly disposed bracket fitting portions 11f, and a nut 11g is solidly attached to the inner side of each bracket fitting portion 11f. A plurality of rivet insertion holes 11h are formed in the side wall portion 11b at given intervals. Stopper portions 11i are formed in the front and rear walls of the side wall portion 11b, alternately with the rivet insertion holes 11h. Having the structure as above, the base plate 11 is adapted to be fastened, by means of bolts T shown in FIG. 8 that are screwed in the nuts 11g of the bracket fitting portions 11f, to the pair of horn plates, which are opposingly provided at the side facing the steering wheel body 2.

The inflator 12 includes a generally cylindrical inflator body 12a, and a plurality of gas ejection holes 12b serving as a gas supplying portion for ejecting gas are formed at the upper part of the inflator body 12a, the gas ejection holes 12b being radially arranged at predetermined intervals. A flange portion 12c for mounting operation projects outward from the inflator body 12a, and a plurality of bolt through holes 12d are formed in the flange portion 12c. An actuating portion such as an igniter or a squib is disposed inside the inflator body 12a and connected to a lead wire 12e that is drawn out of the underside of the inflator body 12a, and the interior of the inflator body 12a is filled with chemical pellets. By supplying electrical energy to the actuating portion, reaction of the chemical pellets is initiated so that a great quantity of inert gas, such as nitrogen gas, is instantaneously generated and ejected from the gas ejection holes 12b.

The air bag 14 is formed into a bag by laying an upper fabric material 14a and a lower fabric material 14b one upon the other and integrally sewing the two bag materials together along the edge. The upper and lower fabric materials 14a, 14b are circular bag materials having the identical shape and made of nylon or polyester geowoven or the like. A gas inlet opening 14c forward in the shape of a circular hole and adapted to permit the upper half of the inflator body 12a to be inserted therein is formed at the center of the lower fabric material 14b. The lower fabric material 14b will be the side facing the steering shaft S when the air bag has been expanded. The lower fabric material 14b also has a plurality of bolt through holes 14d, which are formed around the gas inlet opening 14c, and a reinforced base portion 14f formed by placing a ring-shaped reinforcing cloth 14e on the lower fabric material 14b and sewing them together. The lower fabric material 14b is also provided with one or more degassing openings (not shown) at a distance from the gas inlet opening 14c. A ring-shaped reinforcing cloth is placed around each degassing opening and is integrally sewed to the lower fabric material 14b in order to strengthen the portions of the lower fabric material 14b where the gassing openings are located. The center of the upper fabric material 14a, which will be the side facing the driver when the air bag has been expanded, is the portion that faces the gas inlet opening 14c and referred to as the air bag front portion 17. A mounting hole 14g serving as a fastenable portion is bored through the center of the airbag front portion 17. If it is necessary, the portion around the mounting hole 14g may be reinforced by sewing a reinforcing cloth to the portion.

The retainer 15 includes a ring-shaped sandwiching portion 15a and an expanded portion 15b that expands upward in the shape of a dome (or a cup placed upside down) from the inner circumferential edge of the sandwiching portion 15a. The sandwiching portion 15a has a rectangular outline with rounded corners when viewed from above, and a circular aperture is formed at the center of the sandwiching portion 15a. A plurality of through holes (not shown) are formed in the flat portion of the sandwiching portion 15a at regular intervals, and a stud bolt 24 is inserted through each through hole from above and crimped, welded or otherwise solidly fastened in the state that it projects downward. Each stud bolt 24 is adapted to have a nut 25 screwed therearound. A reinforcing outer wall portion 26 raised upward is integrally formed along the peripheral ends of the sandwiching portion 15a. The outer wall portion 26 is either chamfered or angled and serves to protect the base portion 14f of the air bag 14.

The expanded portion 15b comprises a cylindrical portion 15c which may be raised from the sandwiching portion 15a as an integral body therewith or may be formed as a separate member and integrally fastened to the sandwiching portion 15a, an angled portion 15d which has a shape of a cone with its apex cut off and rises from the cylindrical portion 15c, the upper end of the angled portion 15d having a diameter smaller than that of the lower end, and a flat top plate portion 15e that closes the upper end of the angled portion 15d. The upper half of the inflator 12a of the inflator 12 is housed in the cylindrical portion 15c of the expanded portion 15b, while the angled portion 15d is provided with a plurality of circular gas through holes 15f which are arranged at specified intervals and serve as a gas guiding portion. A fastening hole 15g serving as a fastening portion is formed at the center of the top plate portion 15e.

By means of injection molding or using other appropriate methods, the cover (the air bag cover) 21 is integrally formed of a synthetic resin, such as a soft thermoplastic elastomer, into an approximately box-shaped body which is open at the lower end and comprises a cover portion 31 and a mounting portion 32. The mounting portion 32 is in the shape of a square tube projecting downward from the back face, in other words the inner surface, of the cover portion 31. The cover portion 31 is adapted to cover 21 the boss portion 6 of the steering wheel body 2 and a part of the spokes of the steering wheel. Provided at the approximate center of the outer face, i. e. the upper surface, of the cover portion 31 of the cover 21 is a circular, flat surface portion 31a which serves as a pushing portion to operate the horn switch. The remaining part of the upper surface of the cover portion 31 extends from the flat surface portion 31a in the fore-and-aft and left and right directions in a gentle curve and continues to the outer cover that covers the spokes.

A tear line 36 adapted to serve as the breakthrough portion where the cover is designed to be torn is formed in the back surface (the underside) of the cover portion 31. The tear line 36 has a shape resembling the letter H when viewed from below and is formed as an indentation which is weaker than the remaining part of the cover portion 31 so that, when the air bag 14 is inflated, the cover portion 31 is torn along the tear line 36 and forms a pair of doors that open in the fore-and-aft directions.

The mounting portion 32 of the cover 21 is formed in a generally rectangular tube to be fitted around the outer peripheral surface of the side wall portion 11b of the base plate 11. A plurality of rivet insertion holes 32a (for example, two or three holes) adapted to respectively communicate with the rivet insertion holes 11h of the side wall portion 11b are formed at given intervals in each one of the fore ends of the mounting portion 32, i. e. at the front and back and right and left ends. The two lateral ends of the mounting portion 32 are respectively provided with cutout portions 32 adapted to face or fit to the bracket fitting portions 11f that are formed at two opposing ends of the side wall portion 11b. The other two ends of the mounting portion 32, i. e. the front and rear ends, have stopper protrusions (not shown) which are located adjacent to the rivet insertion holes 32a and protrude inward.

Next, the procedure of assembling the air bag device 4 described above is explained hereunder.

First of all, in order to attach the air bag 14 to the base plate 11, the retainer 15 having the expanded portion 15b is inserted from the gas inlet opening 14c into the air bag 14, the stud bolts 24 are inserted into the respective bolt through holes 14d of the air bag 14, and the gas inlet opening 14c of the air bag 14 is brought into the position corresponding to the inner peripheral edge of the sandwiching portion 15a of the retainer 15. Then, a rivet 41 serving as a stopper member for securing the air bag 14 is inserted from the outside of the air bag 14 through the mounting hole 14g of the air bag 14 into the fastening hole 15g of the retainer 15 and crimped, so that the center portion of the upper fabric material 14a of the air bag 14 is affixed to the retainer 15. Thereafter, the stud bolts 24 of the retainer 15, which project from the air bag 14, are inserted from above into the bolt through holes 11d of the base plate 11, and the inflator mounting hole 11c of the base plate 11 is brought into the position corresponding to the gas inlet opening 14c of the air bag 14.

Then, the air bag 14 is folded into a shape resembling flower petals by wrapping the air bag around the outer peripheral surface of the expanded portion 15b of the retainer 15 so that the air bag 14 can be housed in the annular space defined by the peripheral edge of the top plate portion 11a of the base plate 11.

Then, the cover 21 is placed from above over the folded air bag 14, and the side wall portion 11b of the base plate 11 is fitted in the mounting portion 32 of the cover 21, thereby housing the air bag 14 in the cover 21. In this state, positioning and temporary fixing of the cover 21 is done by engaging the stopper protrusions (not shown) that protrude from the mounting portion 32 of the cover 21 with the stopper portions 11i of the side wall portion 11b of the base plate 11. The mounting portion 32 of the cover 21 is then affixed to the base plate 11 in this state by inserting rivets R from the outside of the mounting portion 32 of the cover 21 through the rivet insertion holes 32a into the rivet insertion holes 11h of the side wall portion 11b of the base plate 11 and crimping the rivets R. At that time, auxiliary plates (backup plates) 43 may be used, if it is necessary.

Thereafter, by inserting the inflator body 12a of the inflator 12 from the back of the base plate 11 through the inflator mounting hole 11c into the gas inlet opening 14c of the air bag 14 in order to position the inflator in the expanded portion 15b, inserting the stud bolts 24 projecting downward from the base plate 11 into the bolt through holes 12d of the flange portion 12c, and securing the stud bolts 24 by tightening the nuts 25, the air bag device 4 is assembled as shown in FIG. 2 in the state where the base plate 11 and the air bag 14 are securely supported between the retainer 15 and the flange portion 12c of the inflator 12.

The assembled air bag device 4 is attached to the steering wheel body 2 with the bracket fitting portions 11f of the base plate 11 fastened to the horn plates of the steering wheel body 2 by means of bolts T. In this state, the back face of the flat surface portion 31a of the cover portion 31 of the cover 21 is supported by the top plate portion 15e of the expanded portion 15b with one to approximately three layers of the upper fabric material 14a or the lower fabric material 14b of the air bag 14 between the flat surface portion 31a and the top plate portion 15e. Therefore, when the flat surface portion 31a is pushed with a finger or the like, the whole air bag device 4 moves downward, and the contact points respectively provided at the boss plates and the bass plates at locations corresponding to each other come into contact with each other so that the horn is sounded.

In the event of, for example, a collision of a vehicle equipped with an air bag device 4, the igniter of the inflator 12 is actuated by signals from a collision detecting unit (not shown) to cause reaction of the propellant filling the inflator so that a large quantity of inert gas, such as nitrogen gas, is instantaneously ejected through the gas ejection holes 12b formed around the outer wall of the inflator 12. The gas is ejected into the air bag 14 radially and diagonally upward at a given angle in such a manner as to envelope the inflator 12 as it passes through the gas through holes 15f formed around the angled portion 15d of the expanded portion 15b of the retainer 15.

Then, the pressure of the expansion of the air bag 14 tears the generally H-shaped tear line 36 of the cover portion 31 of the cover 21, thereby forming a pair of doors that open in the fore-and-aft directions. As these doors open in the fore-and-aft directions, a breakthrough opening is formed to permit the air bag 14 project therethrough.

Figure 3:
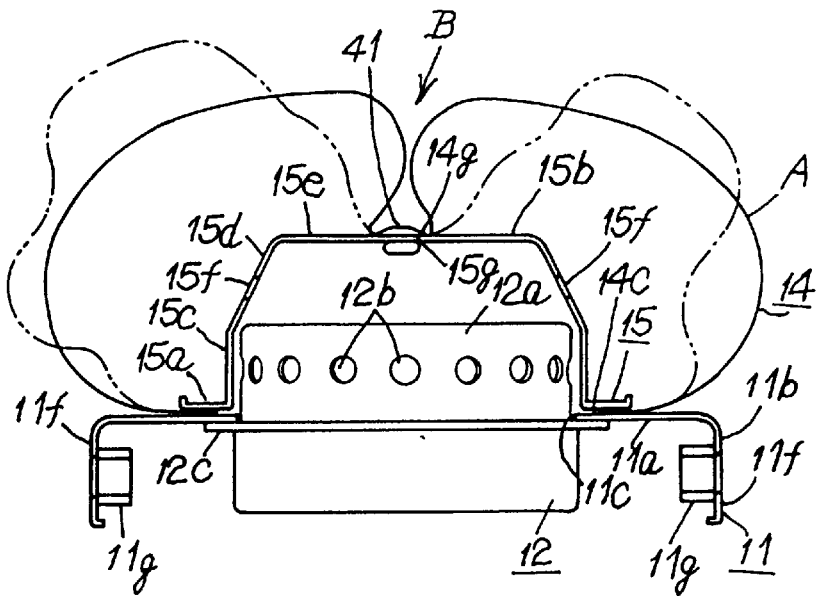
FIG. 3 is a schematic illustration to explain how said air bag device operates.

In this state, the air bag 14 is secured with the center of its upper fabric material 14a fastened to the expanded portion 15b of the retainer 15. Furthermore, the gas is ejected diagonally upward in radial directions through the gas through holes 15f. Therefore, at the initial stage, the air bag 14 begins to be unfolded and expanded round and outwardly from the portion around the retainer 15 as indicated by two-dot chain lines in FIG. 3. When the inflow gas has increased the volume of the air bag 14 to the maximum extent, the portion that has been inflated round, i. e. the portion A represented by solid lines in FIG. 3, expand toward the center portion B located at the driver's side of the expanded portion 15b until the portion A expands to such a state as to serve as an air cushion to receive the driver and absorb the shock of the collision. This state is most plainly shown in FIG. 4.

As described above, according to the structure of the present embodiment, the air bag 14 is secured with the center of its upper fabric material 14a firmly fastened to the center of the expanded portion 15b of the retainer 15, and the gas is ejected diagonally upward in radial directions through the gas through holes 15f. Therefore, the present embodiment is capable of limiting the projection of the air bag 14 toward the driver and also forming an air cushion around and in front of the inflator 12 while permitting the air bag to be inflated rapidly and widely in radial directions. Thus, the present embodiment offers superior expansion characteristics to effectively protect the driver.

As the air bag 14 is secured with its upper fabric material 14a fastened at a predetermined location, the embodiment offers stable performance characteristics of shock absorption by preventing the air bag 14 from swinging when it is inflated and when the inflated air bag 14 receives the shock.

Furthermore, as the air bag 14 is fastened to a given location by crimping the rivet 41, which is inserted from the outside of the air bag 14, against the rigid expanded portion of the retainer 15, the structure of the present embodiment is capable of simplifying steps of the production process, such as, for example, the process of sewing the air bag 14, and reducing production costs, compared with other structures which call for disposing a belt, a strap or a cloth in the air bag and sewing them together.

Another benefit of the embodiment lies in that the gas ejected by the inflator 12 is guided by means of the gas through holes 15f of the retainer 15 so as to be ejected radially and diagonally upward. This feature has benefits not only in easily improving the expansion characteristics of the air bag 14 by helping the formation of an air cushion around and in front of the inflator 12 but also in protecting the air bag 14 by preventing the hot gas from being directly blown to the base portion 14f of the air bag 14.

As the expanded portion 15b formed as an integral body with the retainer 15 is provided with a fastening hole 15g, which is adapted to have the air bag 14 fastened thereto by means of a rivet 41, and a gas through holes 15f for guiding gas, the embodiment is capable of achieving the benefits described above and hereunder without increasing the number of necessary parts. Therefore, the embodiment is capable of preventing increase in production costs.

In addition, the structure wherein the expanded portion 15b of the retainer 15 is formed in such a shape as to expand or protrude from the direction of the base plate 11 into the air bag 14, the invention is capable of fastening the center portion of the air bag 14 at an appropriate location for improving the expansion characteristics of the air bag 14 and also capable of facilitating an fastening operation of the rivet 41.

Figure 5:
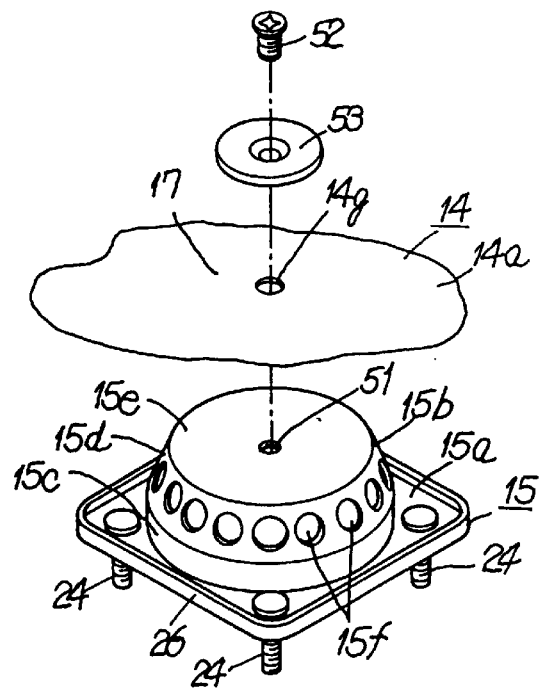
FIG. 5 is an exploded perspective of an air bag device according to a second embodiment of the present invention.

Although the invention is explained referring to the above embodiment, wherein the air bag 14 is fastened to the retainer 15 by means of a rivet 41, the air bag 14 may be secured at a given location by using various means. For example, as shown in the second embodiment illustrated in FIG. 5, a threaded hole. 51 serving as a fastening portion may be formed in the top plate portion 15e of the expanded portion 15b of the retainer 15 so that the center of the upper fabric material 14a of the air bag 14 may be secured together with a washer 53 by means of a screw 52. In this case, the screw 52 serves as a fixture piece which is adapted to be inserted from above into the mounting hole 14g of the air bag 14 and screwed in the threaded hole 51.

Figure 6:
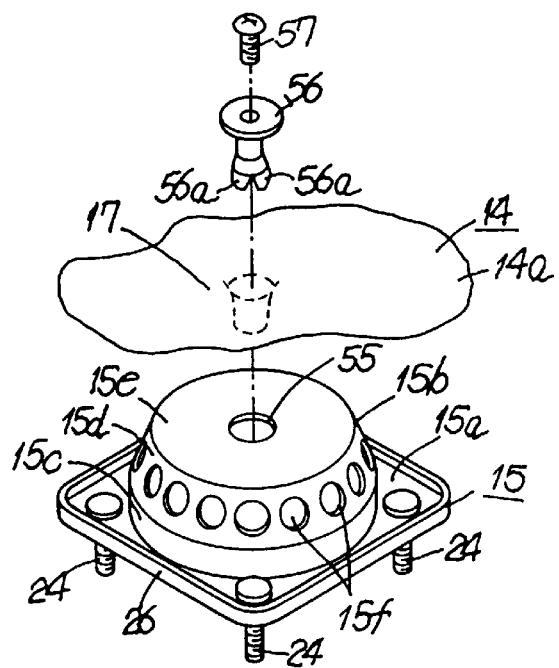
FIG. 6 is an exploded perspective of an air bag device according to a third embodiment of the present invention.

Instead of a configuration which calls for forming a hole in the upper fabric material 14a of the air bag 14, the air bag 14 may be fastened to the retainer 15 as shown in the 3rd embodiment illustrated in FIG. 6, by forming a fastening hole 55 larger than the fastening hole 15g in the top plate portion 15e of the expanded portion 15b of the retainer 15 so that the fastening hole 55 serves as a fastenable portion with a part of the upper fabric material 14a pushed thereinto, inserting a fastener 56 that serves as a fixture piece from above and tightening a screw 57 into the fastener 56, thereby spreading out a plurality of split ends 56a of the fastener 56 to prevent the fastener 56 from inadvertently slipping off.

Figure 7:
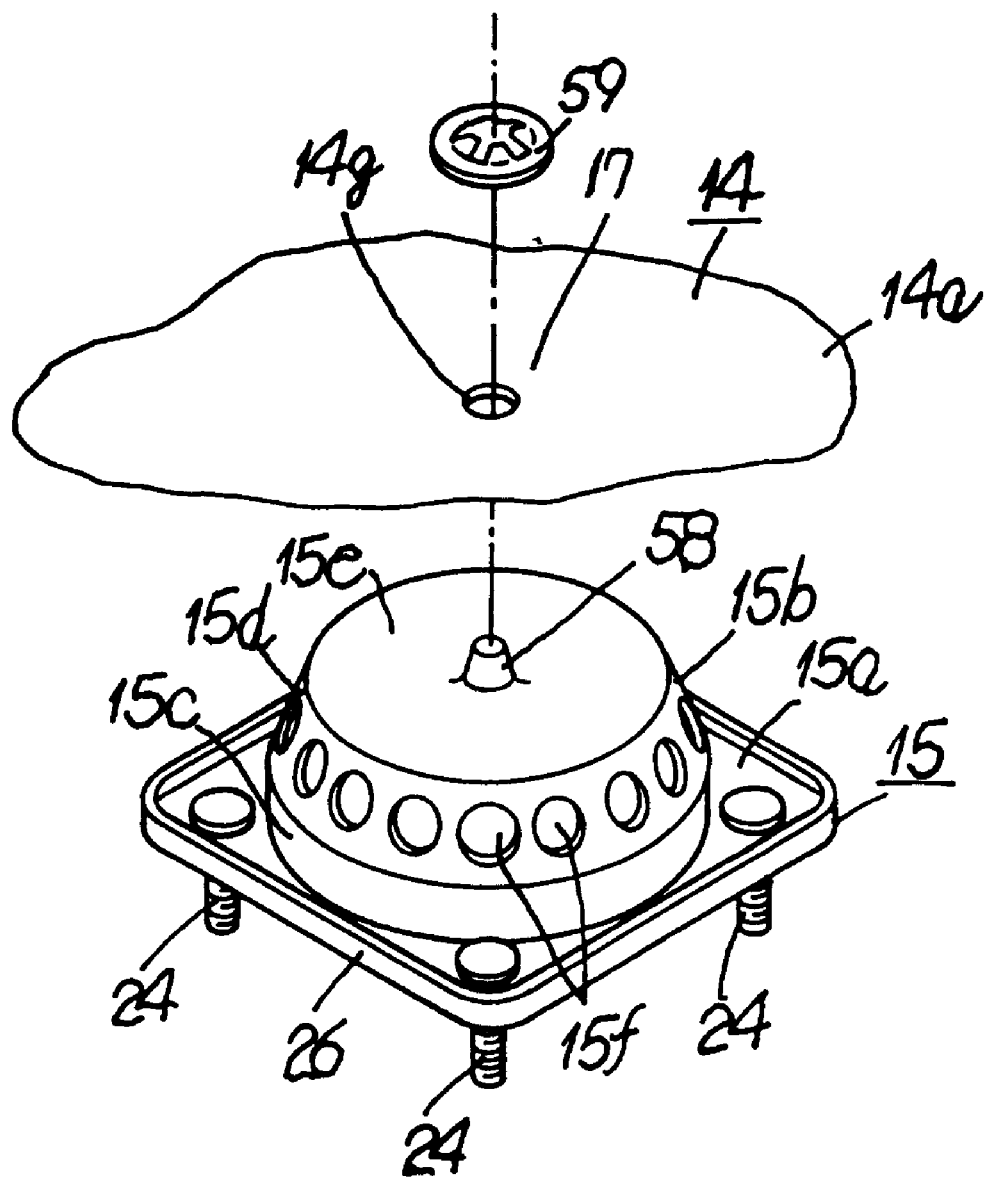
FIG. 7 is an exploded perspective of an air bag device according to a fourth embodiment of the present invention.

Another possible configuration is offered by the 4th embodiment shown in FIG. 7, wherein a boss 58 that projects upward and serves as a fastening portion is formed on the top plate portion 15e of the expanded portion 15b of the retainer 15, and the air bag 14 can be fixed to the retainer 15 by engaging a ring-shaped push nut 59 that serves as a fixture piece around the boss 58 from above in the state where the boss 58 is inserted from underneath in the mounting hole 14g of the air bag 14.

Although the gas guiding portion of the retainer 15 is comprised of a plurality of circular gas through holes 15f according to the embodiments described above, the gas guiding portion may have various configurations such as, for example, slit-shaped through holes or fins which are adapted to adjust directions of gas and formed by making cuts in the retainer and bending the cut portions.

Furthermore, although the expanded portion 15b is formed as an integral body with the retainer for fastening the air bag 14 to the base plate 11 according to the embodiments described above, the supporting member where the fastening portion is provided may be formed as a separate body from the retainer 15 or, in order to reduce the number of parts and production costs, may be formed as an integral body with another member, such as the inflator or the base plate.

In addition to being folded in the shape like flower petals, the air bag 14 may be folded in other ways, such as, for example, placing a plurality of layers of the bag materials of the air bag 14 one upon another over the expanded portions 15b that covers the inflator 12.

Next, the fifth embodiment of the invention is explained hereunder, referring to FIG. 8 through 13.

The elements similar to those in the embodiment shown in FIG. 1 are identified with the same reference numerals, with the explanation thereof being omitted. To be more specific, the base plate 11, the inflator 12 and the cover 21 in this embodiment have the same configurations as those in the first embodiment, and, therefore, they are identified with the same reference numerals, with the explanation thereof being omitted.

The air bag 61 is formed into a bag by laying an upper fabric material 62 serving as the first bag material and a lower fabric material 63 serving as the second bag material one upon the other and integrally sewing the two bag materials together along the edge. The upper and lower fabric materials 62,63 are circular bag materials having the identical shape and made of nylon or polyester geowoven or the like. A gas inlet opening 65 having the shape of a circular hole and adapted to permit the upper half of the inflator body 12a to be inserted therein is formed at the center of the lower fabric material 63, which will be the side facing the steering shaft S when the air bag has been expanded. The lower fabric material 63 also has a plurality of bolt through holes 66, which are formed around the gas inlet opening 65, and a base portion 68 formed by placing an appropriate number of ring-shaped reinforcing cloths 67 on and under the lower fabric material 63 and sewing them together with the peripheral edge further reinforced with stitches. The lower fabric material 63 is also provided with one or more degassing openings 69 (vent holes) at a distance from the gas inlet opening 65. The portions around the degassing openings 69, too, are reinforced either by means of ring-shaped reinforcing cloths 70, which are respectively placed around the degassing openings and are integrally sewed to the lower fabric material 63, or simply by stitching around the degassing openings without using a reinforcing cloth.

A mounting hole 73 serving as a fastenable portion is bored through the center of the air bag front portion 72 of the upper fabric material 62, which will be the side facing the driver when the air bag has been expanded, said air bag front portion 72 facing the gas inlet opening 65. The portion around the mounting hole 73 is reinforced by placing an appropriate number of patches, which are ring-shaped reinforcing cloths 74 in case of this embodiment, around the mounting hole 73 from above and underneath the lower fabric material 63 and sewing them together with the peripheral edge further reinforced by means of stitches.

An auxiliary bag material 75 serving as a third bag material is placed on the upper fabric material 62. The auxiliary bag material 75 has a circular shape which is smaller than the upper fabric material 62 and the lower fabric material 63. The auxiliary bag material 75 is positioned coaxially with the upper fabric material 62 and the lower fabric material 63 and sewed to the upper fabric material 62 near the outer edge in such a manner that the stitch lines extend in parallel to one another along the peripheral edge of the fabric materials, with a predetermined distance between adjacent stitch lines and that the stitch lines are broken at given intervals, the non-stitched portions extending in the circumferential direction at an identical distance. As a result, the space between the auxiliary bag material 75 and the upper bag material 62 is neither airtightly sealed nor lead to the interior of the bag formed by the upper fabric material 62 and the lower fabric material 63 to permit inflow of gas but, instead, communicates with space outside the air bag. Further, the sewing process of the air bag 61 is comprised of sewing the auxiliary bag material 75 and the upper bag material 62 together and, then, sewing the upper fabric material 62 and the lower fabric material 63 together.

Figure 11:
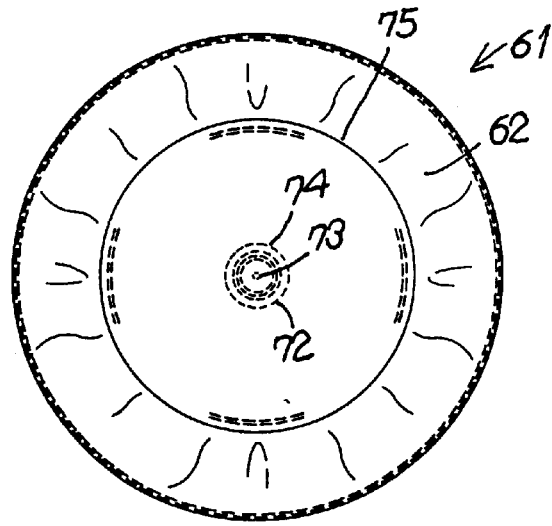
FIG. 11 is a top view of the flatly spread air bag of said air bag device.
Figure 12:
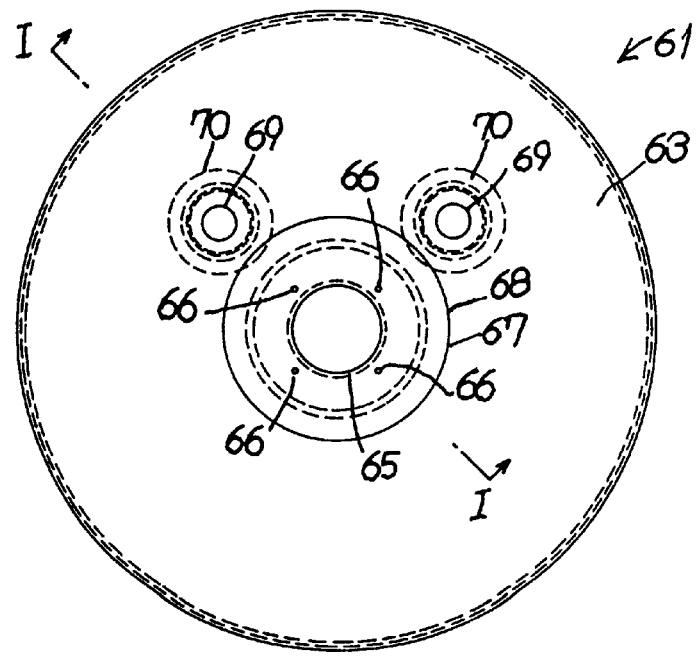
FIG. 12 is a bottom view of said air bag in the state where the air bag is flatly spread out with no auxiliary bag material attached thereto.
Figure 13:
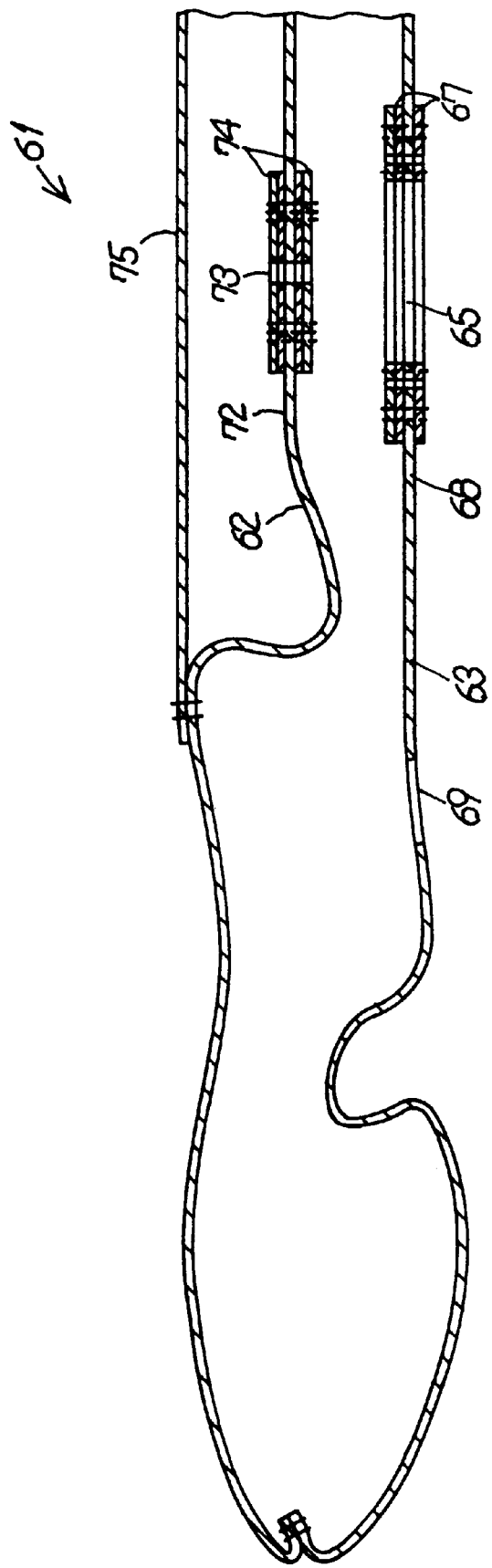
FIG. 13 is a sectional view of said air bag taken along line I—I of FIG. 12.

The auxiliary bag material 75 is sewed to the upper bag material 62 in the state where the auxiliary bag material 75 is flatly spread out, and the upper bag material 62 is slightly gathered towards the center with gather folds formed to some extent. In other words, as shown in FIGS. 12 and 11, the bag in the flatly spread-out state with the auxiliary bag material 75 sewed to the upper bag material 62 as shown in FIG. 11 has a diameter smaller than the upper and lower fabric materials 62,63 in the flatly spread-out state as shown in FIG. 12.

The retainer 81 includes a sandwiching portion 82 which forms a ring and an expanded portion 83 that expands upward in the shape of a dome (or a cup placed upside down) from the inner circumferential edge of the sandwiching portion 82. The sandwiching portion 82 has a rectangular outline with rounded corners when viewed from above, and a circular aperture is formed at the center of the sandwiching portion 82. A plurality of through holes (not shown) are formed in the flat portion of the sandwiching portion 82 at regular intervals, and a stud bolt 84 is inserted through each through hole from above and crimped, welded or otherwise solidly fastened in the state where it projects downward. Each stud bolt 84 is adapted to have a nut 25 screwed therearound. A reinforcing outer wall portion 85 raised upward is integrally formed along the peripheral ends of the sandwiching portion 82. The outer wall portion 85 is either chamfered or angled and serves to protect the base portion 68 of the air bag 61.

The expanded portion 83 is formed either as a body integrally extending from the sandwiching portion 82 or as a separate member and fastened to the sandwiching portion 82. A plurality of generally triangular gas through holes 87 adapted to serve as a gas guiding portion are formed in the cylindrical wall of the expanded portion 83 at specified intervals. A fastening hole 88 serving as a fastening portion is formed at the upper end, in other words at the center, of the expanded portion 83, and a nut 89 having a threaded hole that communicates with the fastening hole 88 is disposed under the fastening hole 88 and affixed thereto. This portion has such a configuration that a fastener 90, which is a screw serving as a fixture piece, may be pushed or screwed from above into the threaded hole of the nut 89 and thus affixed to the nut 89.

Figure 10:
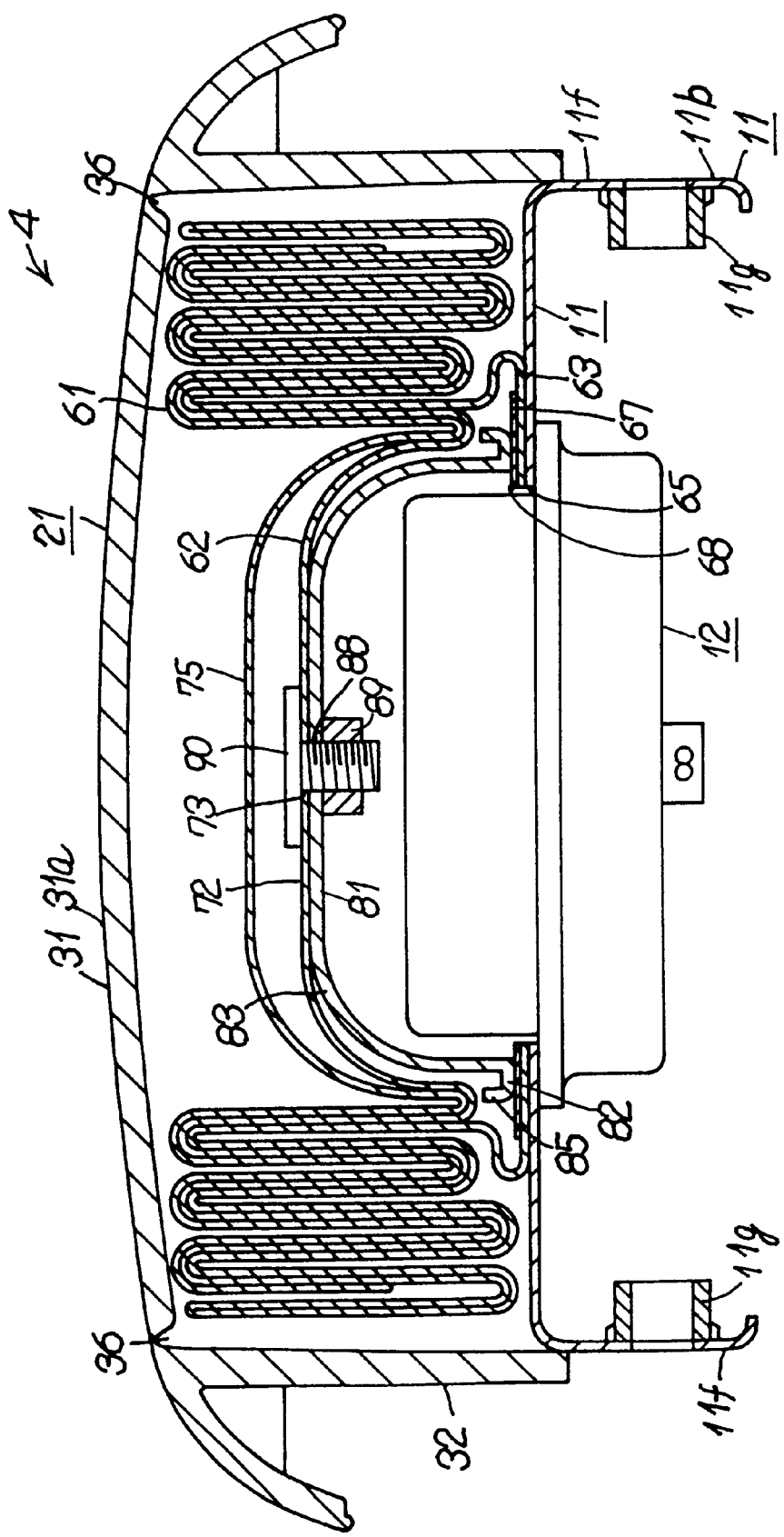
FIG. 10 is a sectional view of same.

As it is true in the embodiment shown in FIG. 1, the air bag device 4 having the structure as above is assembled with the air bag 61 disposed between the retainer 81 and the nut 25 and affixed to the base plate 11 together with the inflator 12 by means of tightening the nut 25. Then, after the center portion of the upper fabric material 62 is secured in the fastening hole 88 at the top of the retainer 81 by means of the fastener 90 inserted in the mounting hole 73, the air bag 61 is folded according to any appropriate method, for example, in the manner of line-folding or origami folding, which calls for folding the air bag along predetermined lines, or in the manner of what is generally called flower-petal folding that calls for pushing the air bag from the outer end towards the retainer 81 at the center and wrapping the fabric around the retainer 81. FIG. 10 shows a state where the air bag is folded in the manner of flower-petal folding. Thereafter, the cover 21 is placed over the folded air bag 61, and the cover 21 is fastened to the base plate 11 by using rivets R and auxiliary plates (assist plates) 43 or the like. Thus, the assembly of the air bag device 4 is completed.

Figure 8:
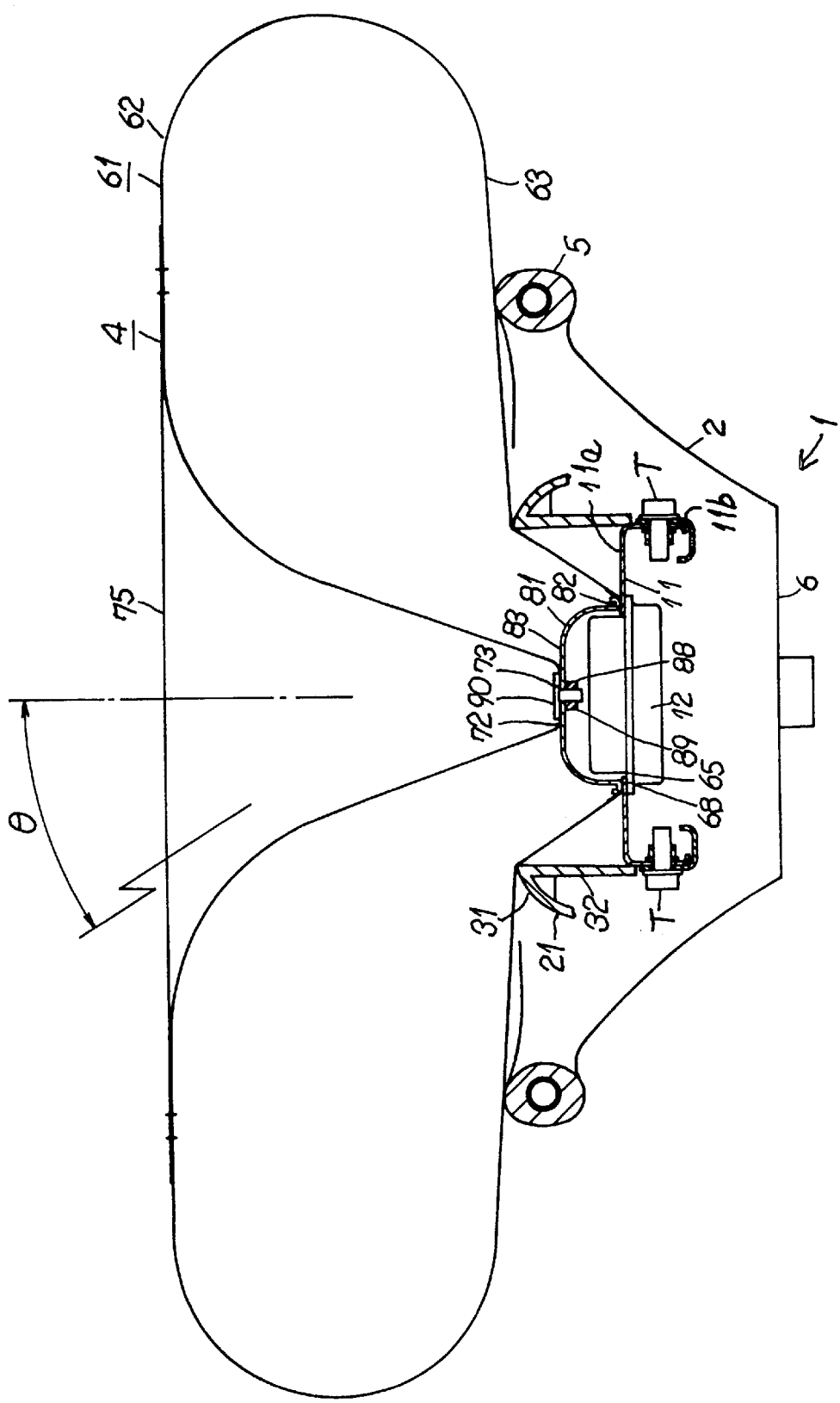
FIG. 8 is schematic illustration to explain the operation of an air bag device according to a fifth embodiment of the present invention.
Figure 9:
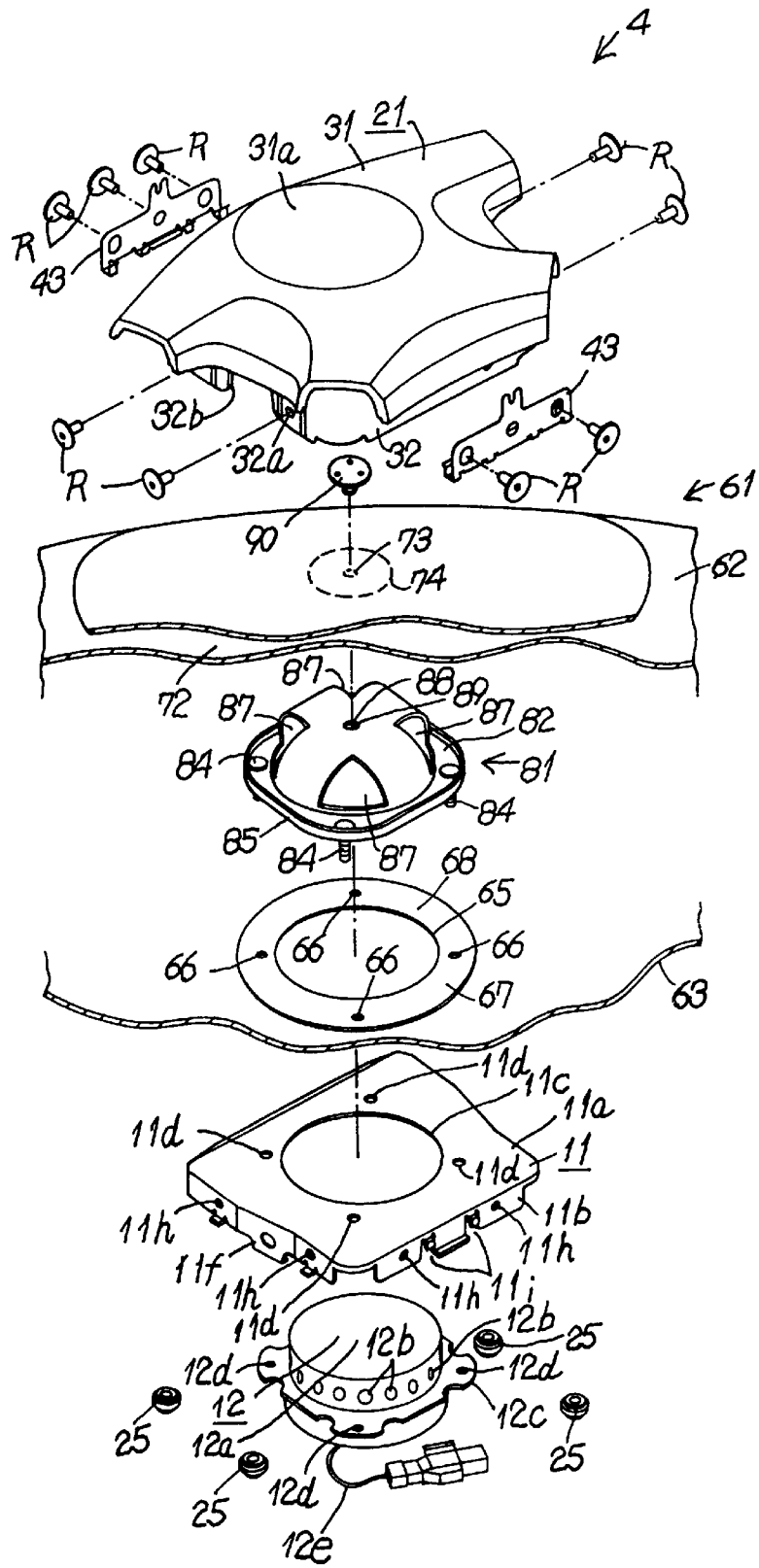
FIG. 9 is an exploded perspective of said air bag device according to the fifth embodiment.

According to the structure of the 5th embodiment described above, when the inflator 12 of the air bag device 4 attached to the steering wheel body 2 is actuated to eject gas nearly horizontally in radial direction through the gas through holes 87 of the retainer 81, the pouch-shaped portion of the air bag 61 that is formed by the upper fabric material 62 and the lower fabric material 63 is inflated radially into a shape resembling a donut as shown in FIG. 8, because its center portion is secured. At the same time, the auxiliary bag material 75 pulled by the upper fabric material 62 is flatly spread out. Thus, these portions on the whole form a cushion for receiving the driver. In short, according to the structure of the 5th embodiment, the pouch-shaped portion of the air bag 61 is adapted to expand in a donut-like shape while the auxiliary bag material 75 spreads in such a manner as to cover the indented portion at the center of the donut so that the air bag 61 functions like a trampoline or a safety mat to receive the driver stably over a large area, thereby effectively absorbing the shock.

To be more specific, as the center portion of the air bag 61 is secured, by means of the fastener 90, at the retainer 81 that serves as the base portion of the air bag device 4, how far the air bag projects toward the driver is limited to a given distance, and the expansion in radial directions is enhanced. Therefore, a large area can be ensured for receiving the driver. In addition, when the air bag 61 is inflated or when the inflated air bag 61 receives a pressure from outside, the upper fabric material 62 of the air bag 61 is secured at the designated position without the danger of being displaced in radial directions with respect to the base plate 11, in other words the steering wheel body 2. Therefore, the air bag is formed at a given position in the evenly inflated state. As a uniform stress is also applied to the peripheral portion of the auxiliary bag material 75 that is spread as it is pulled by the upper fabric material 62, the auxiliary bag material 75 can be stably and flatly spread out. Therefore, the above configuration is not only capable of achieving stable performance of absorbing a shock delivered to the driver but also capable of properly receiving the driver in cases where the contact angle θ shown in FIG. 8 (the angle of collision), at which the driver comes into contact with the air bag 61 is large.

Figure 14:
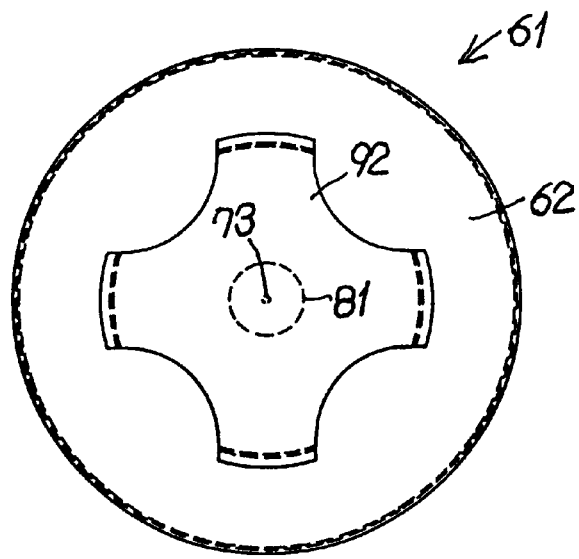
FIG. 14 is a top view of the flatly spread air bag of an air bag device according to a sixth embodiment of the present invention.

An auxiliary bag material to be used for the purpose described above may be made of various materials and have various shapes. For example, it may be formed into a cross-like shape when viewed from the top by cutting the unstitched peripheral portions in the same manner as in case of the auxiliary bag material 92 in the 6th embodiment shown in FIG. 14, or into a star shape by sewing the material at five or six locations in order to reduce the weight. Other than these shapes, the auxiliary bag material may be triangular, rectangular, pentagonal or have any one of other polygonal shapes.

Figure 15:
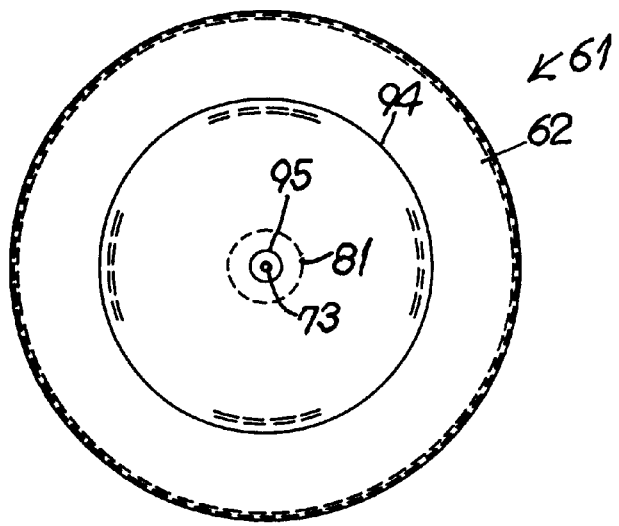
FIG. 15 is a top view of the flatly spread air bag of an air bag device according to a seventh embodiment of the present invention.

Furthermore, as it is true in the 7th embodiment shown in FIG. 15, the operation for affixing the fastenable portion to the fastening portion with a fixture piece can be facilitated by forming a circular hole 95 at the center of the auxiliary bag material 94.

Figure 16:
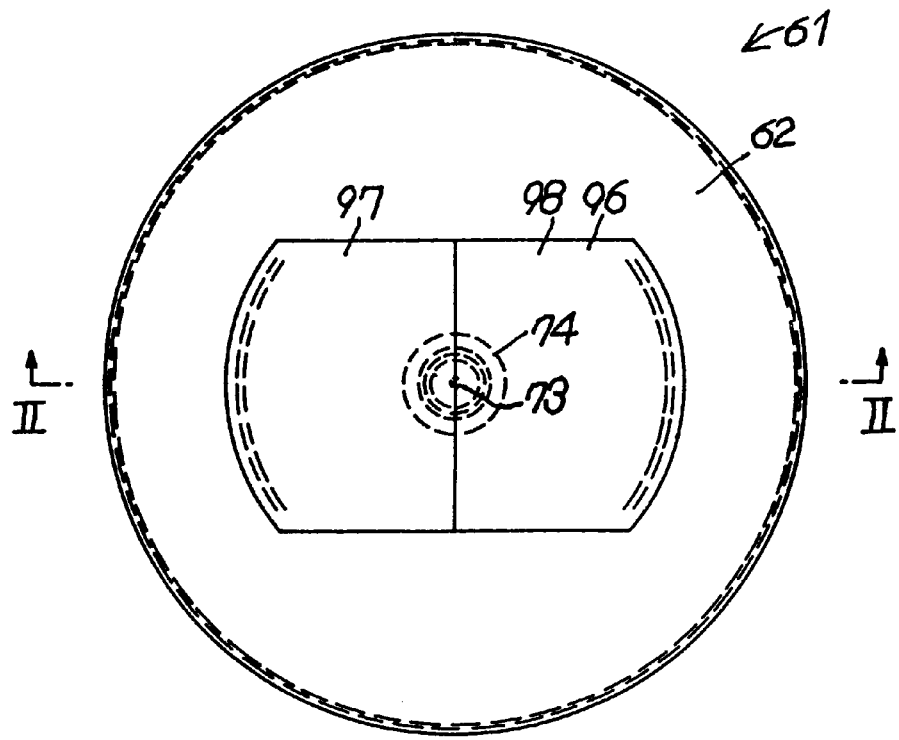
FIG. 16 is a top view of the flatly spread air bag of an air bag device according to an eighth embodiment of the present invention.
Figure 17:
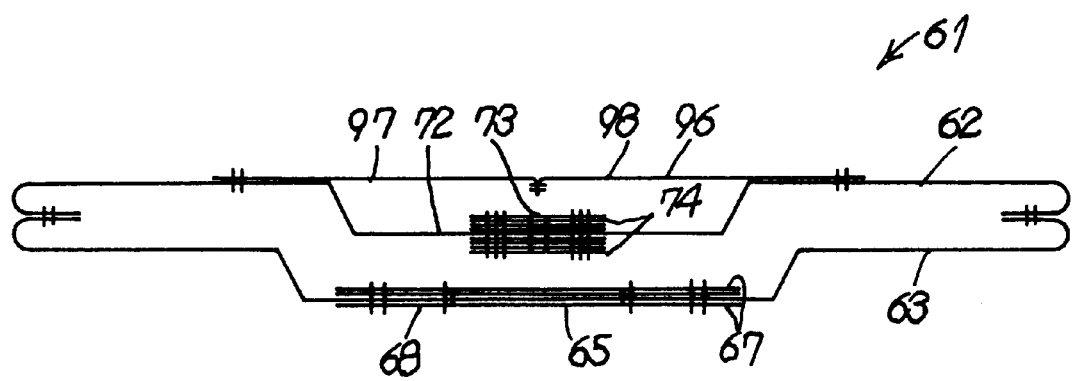
FIG. 17 is a sectional view of said air bag taken along line II—II of FIG. 16.

In the same manner as in case of the auxiliary bag material 96 in the 8th embodiment shown in FIGS. 16 and 17, the auxiliary bag material may be formed by sewing together a fabric material which is divided into a plurality of pieces (two pieces, i. e. fabric pieces 97,98, in case of the 8th embodiment). The configuration of the 8th embodiment makes the production process more convenient in that the upper fabric material 62 and the lower fabric material 63 can be sewed together without gathers, by following a procedure which comprises sewing the fabric pieces 97,98 to respectively designated portions of the upper fabric material 62, sewing the upper and lower fabric materials 62,63 together along their circumferential edges, and then sewing the fabric pieces 97,98 together. The fabric pieces 97,98 may be desirably sewed in such a manner that their hems, i. E. the edges along which they are sewed together, face the upper fabric material 62.

Figure 18:
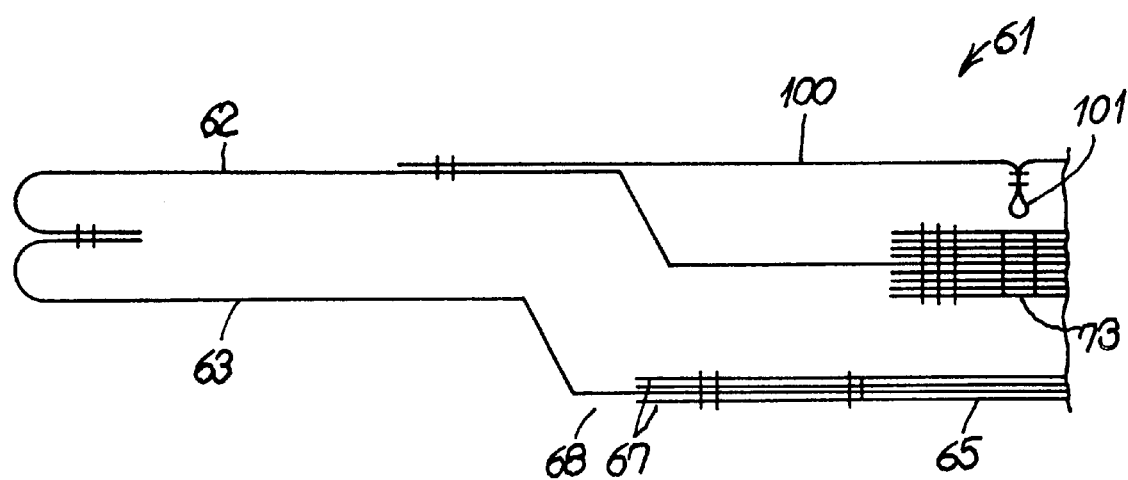
FIG. 18 is a sectional view of an air bag device according to a ninth embodiment of the present invention.

The same effect as that of the 8th embodiment described above can be achieved by the 9th embodiment shown in FIG. 18, wherein the two opposing ends or other appropriate portions of the auxiliary bag material 100 are sewed to the upper fabric material 62 in the state where the auxiliary bag material 100 is flatly spread on the upper fabric material 62, which is also flatly spread without gathers or wrinkles, the upper fabric material 62 and the lower fabric material 63 are then sewed together into a bag, and, thereafter, an excess portion 101 is formed by pinching and sewing the center or other appropriate portion of the auxiliary bag material 100.

The auxiliary bag material may be made of the same material as the upper and lower fabric materials or a different type of fabric, such as cloth, soft resin, a rubber-like material or a net.

In any one of the above embodiments that call for providing an auxiliary bag material, various methods for affixing the fastenable portion of the air bag to the fastening portion of the supporting member, including a method using rivets, may be employed as it is true in the first through fifth embodiments. The gas guiding portion of the retainer, too, may be in various shapes, such as circular holes, slits and so forth.

The supporting member including the fastening portion that is adapted to permit the fastenable portion of the air bag to be fastened may be in various shapes and of various materials, as long as the member can be affixed to the member to which the air bag device is attached, such as the steering wheel body. Therefore, the number of parts and/or production costs can be reduced by using a retaining means in the broad sense, such as a base plate or a reaction can used in an air bag device for a passenger seat, instead of using the retainer described in the above explanation of the embodiments for securing the air bag.

Figure 19:
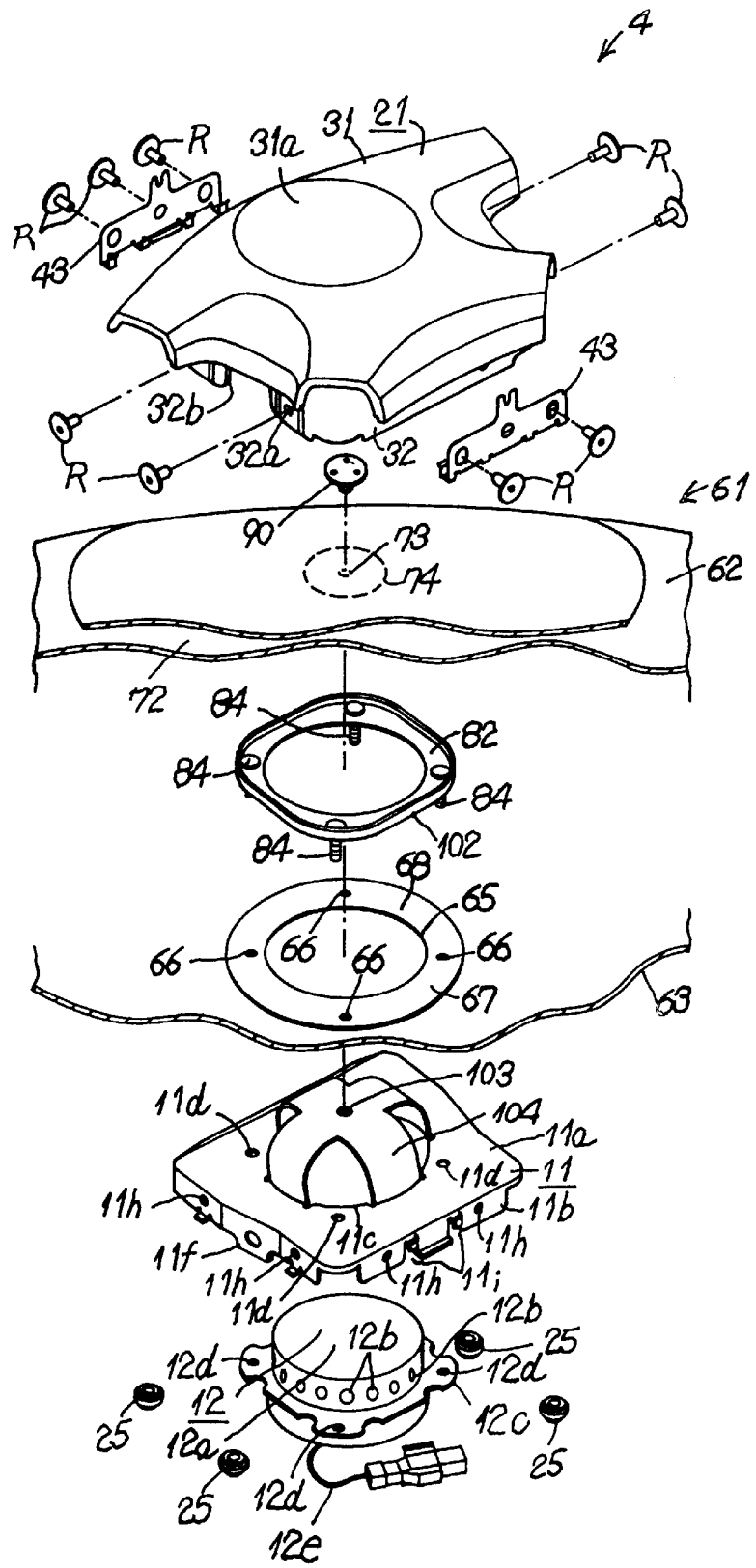
FIG. 19 is an exploded perspective of an air bag device according to a tenth embodiment.
Figure 20:
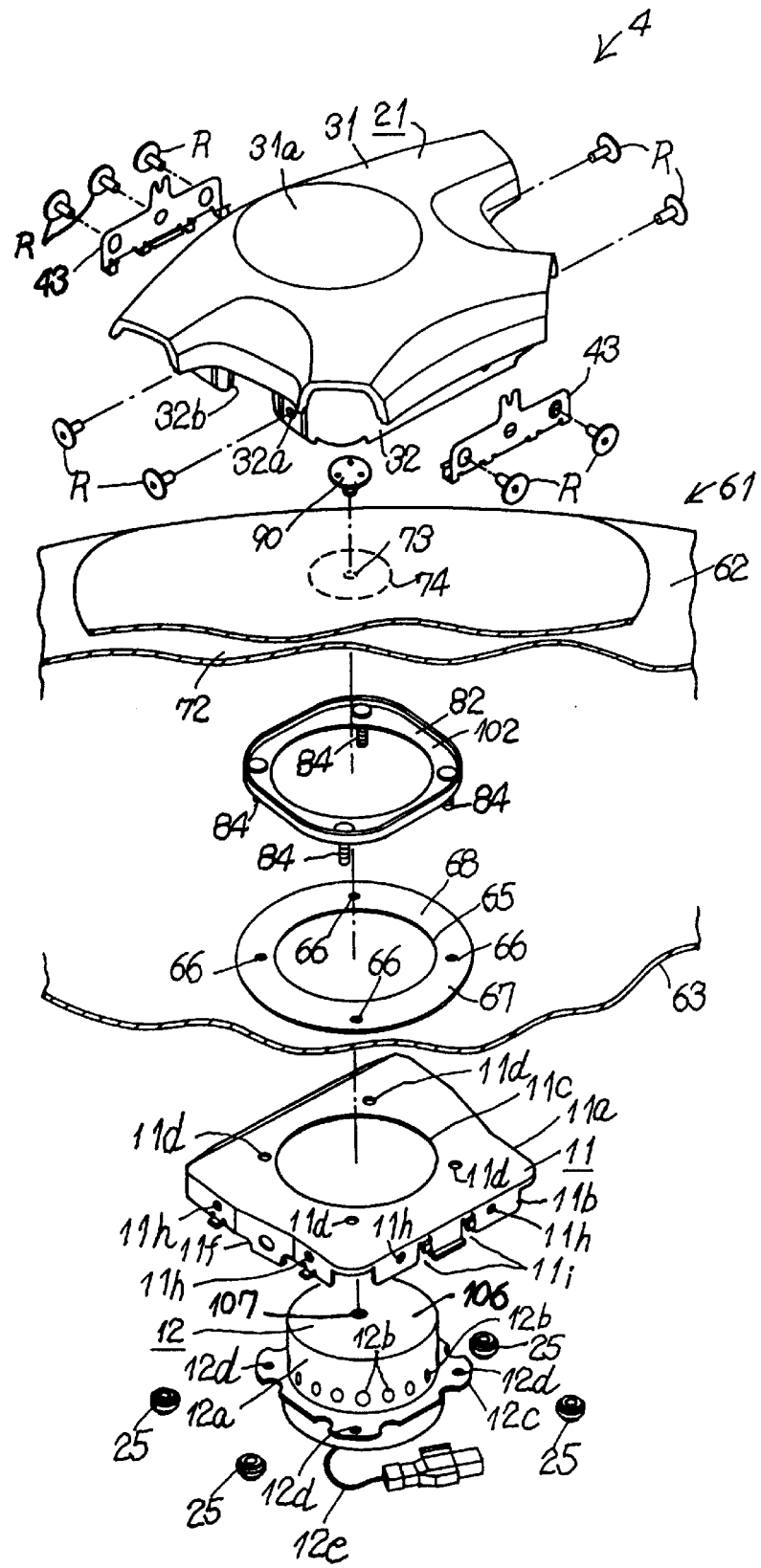
FIG. 20 is an exploded perspective of an air bag device according to an eleventh embodiment of the present invention.

An example of such a configuration is offered in the 10th embodiment shown in FIG. 19, wherein instead of providing the retainer 102 with an expanded portion, an expanded portion 104 having a fastening portion 103 is integrally formed with the base plate 11. In addition, as it is true in the 11th embodiment shown in FIG. 20, the inflator 12 may include an upper surface portion 106 at the top and a fastening portion 107 formed at the center of the upper surface portion 106.

In any one of the embodiments from the first through the 11th embodiment described above, in order to inflate the air bag into a such a shape as to have a completely circular plane and cover the rim portion of the steering wheel, thereby making the characteristics for holding the driver uniform with respect to every direction, the fastenable portion and the fastening portion are provided at the center of the air bag device corresponding to the center of the air bag in the inflated state. However, the fastenable portion and the fastening portion may be provided off the center of the air bag device or the air bag so that the shape of the inflated air bag, in other words the characteristics for holding the occupant, may vary depending on directions.

Figure 21:
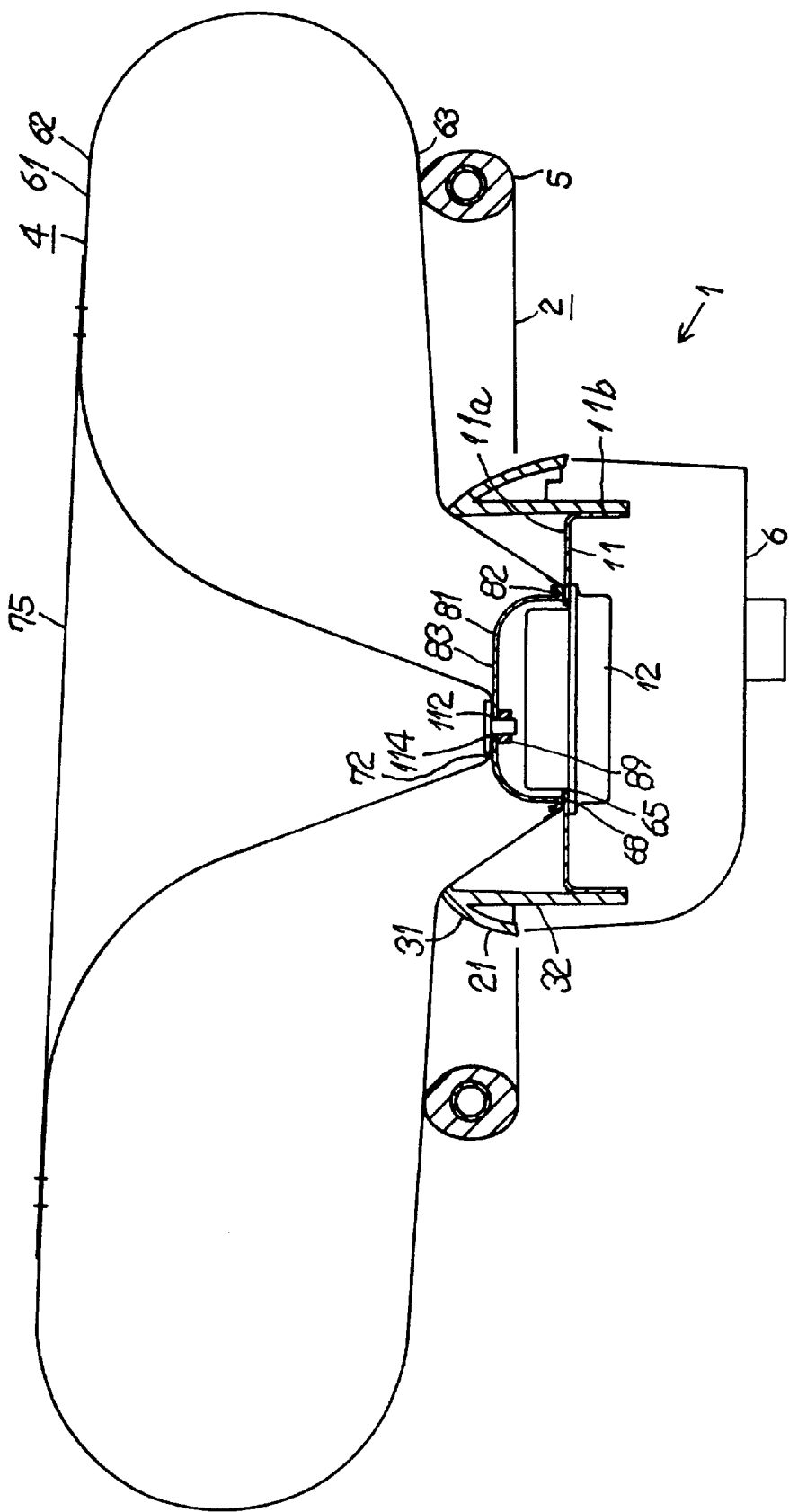
FIG. 21 is a schematic illustration to explain the operation of an air bag device according to a twelfth embodiment of the present invention.
Figure 22:
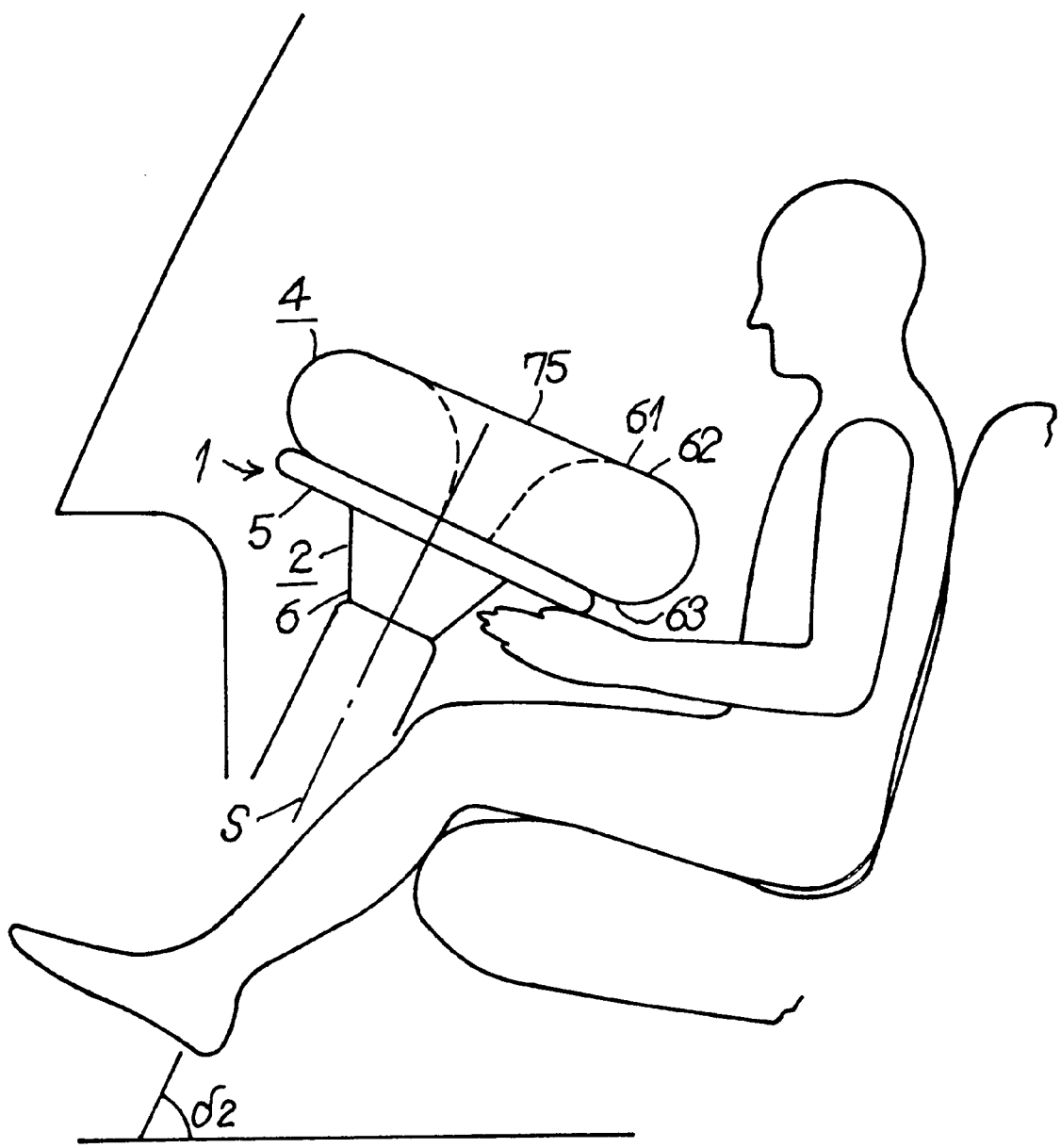
FIG. 22 is a schematic illustration to explain the operation of said air bag device.

An example of such a configuration is offered in the 12th embodiment shown in FIGS. 21 and 22, wherein the center of the air bag device 4, i. e. the center of the base plate 11 and the inflator 12, is displaced from the center of the steering wheel 1 rearward, in other words towards the driver, in the state where the steering wheel 1 is at the neutral position, and the fastening portion 112 of the retainer 81, too, is displaced from the center of the retainer 81, the air bag device 4 and the fastening portion 112 being displaced in the same direction. In addition, if it is necessary, the fastenable portion 114 of the air bag 61 may also be displaced from the center of the upper fabric material 62 in the same direction in order to increase the quantity of the portion of the material at the driver's side. This configuration enables the effective absorption of a shock by inflating the air bag 61 widely between the driver and the rim portion 5 of the steering wheel body 2 of the steering wheel 1 in cases where the angle δ2 as shown in, for example, FIG. 22, between the steering shaft S and the floor is large.

Furthermore, although the upper fabric material of the air bag is secured in the state where it is in direct, close contact with a supporting member such as a retainer according to any one of the embodiments described above, the air bag may be fastened to the supporting member with an auxiliary fitting member therebetween. Said auxiliary fitting member may be flexible.

Figure 23:
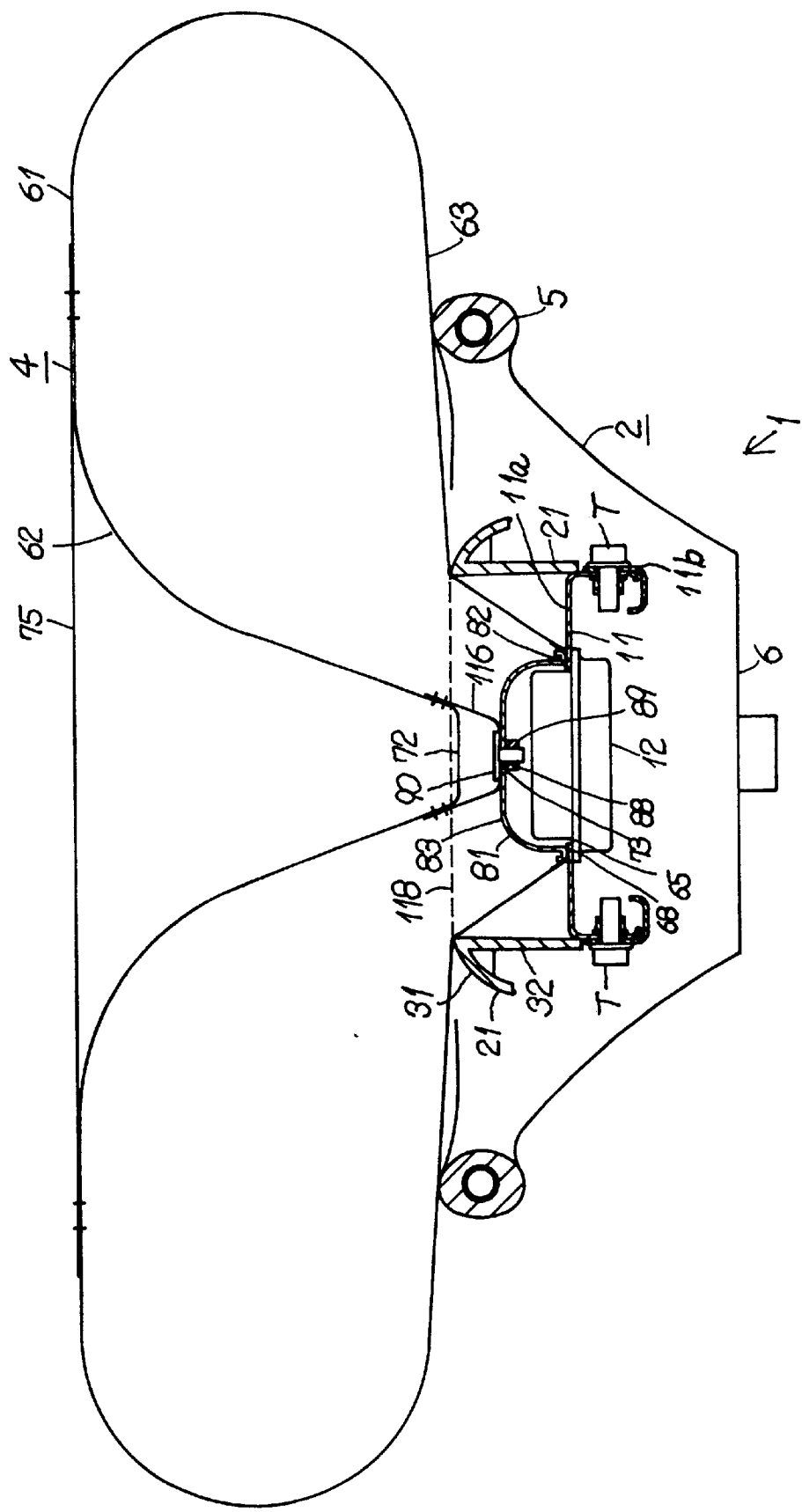
FIG. 23 is a schematic illustration to explain the operation of an air bag device according to a thirteenth embodiment of the present invention.

An example of such a configuration is offered in the 13th embodiment shown in FIG. 23, wherein the air bag front portion 72 of the air bag 61 is fastened to the retainer 81 with a flexible tether 116 therebetween, said tether 116 sewed to the underside of the center portion of the upper fabric material 62 of the air bag 61 and thus serving as an auxiliary fitting member. As a result, the air bag 61 is slightly separated from the retainer 81 that serves as the base portion of the air bag device 4 while the center portion of the air bag 61 is actually restrained so that the air bag 61 is prevented from being displaced in radial directions. Thus, this configuration permits the gas to flow smoothly and is capable of limiting the influence that heat or other undesirable factors exerts on the air bag 61. The air bag front portion 72 of the air bag 61 affixed to the tether 116 may be desirably located near an aperture 118 to be formed when the cover 21 is torn. To be more specific, the air bag front portion 72 must be no greater than approximately 75 mm above or below the aperture 118 and may be desirably located no greater than approximately 50 mm above or below the aperture 118.

Figure 24:
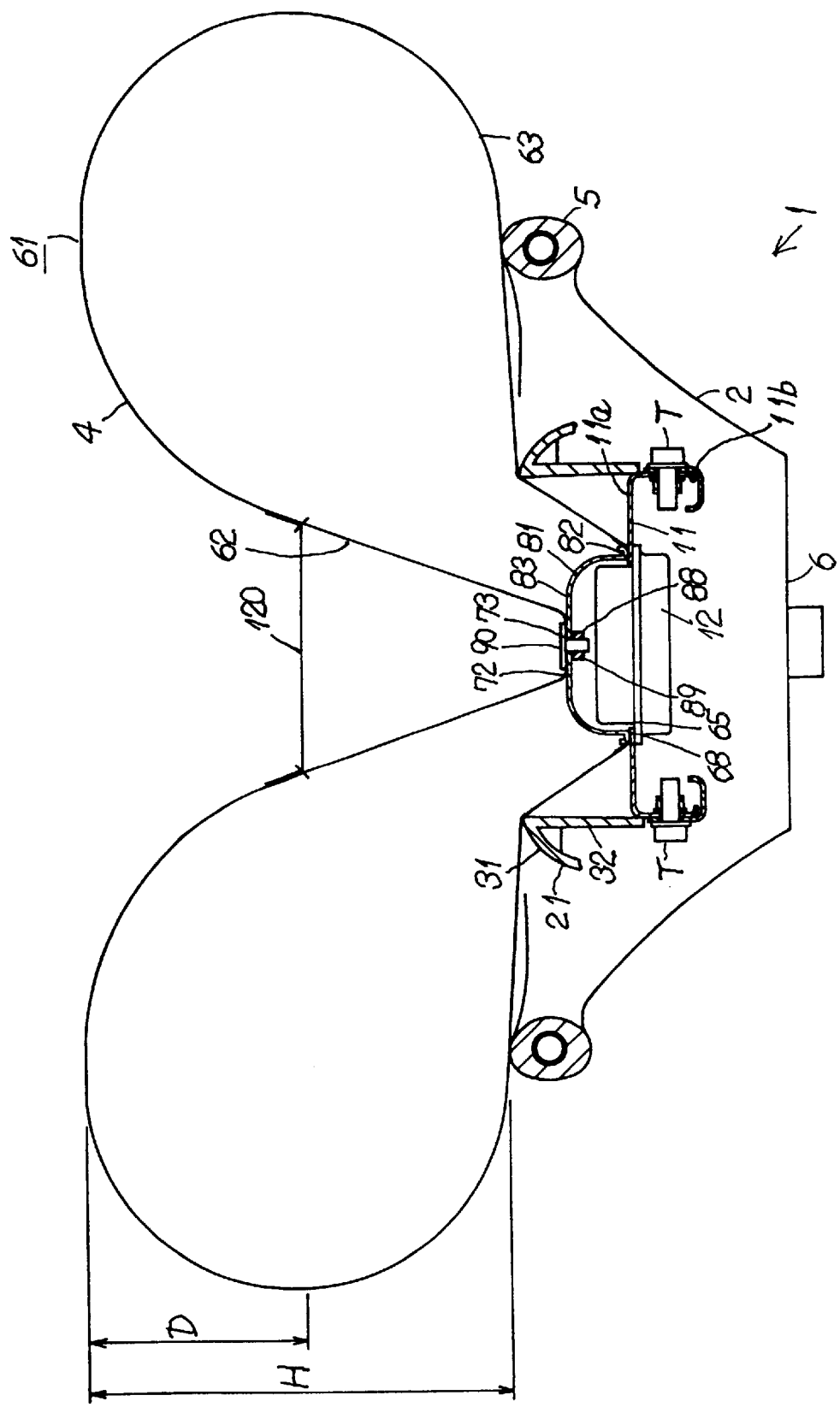
FIG. 24 is a schematic illustration to explain the operation of an air bag device according to a fourteenth embodiment of the present invention.

According to any one of the embodiments that call for provision of an auxiliary bag material, when the air bag is inflated, the auxiliary bag material is located at the approximate top of the air bag, facing towards the driver. However, the invention is not limited to such a configuration, and the location where the auxiliary bag material is sewed may be adjusted. For example, in case of the 14th embodiment shown in FIG. 24, an auxiliary bag material 120 is positioned slightly lower than the upper end of the air bag, with the end facing the driver being regarded as the upper end. As a result of positioning the auxiliary bag material 120 lower, the distance by which the annular, bag-shaped expanded portion of the upper fabric material 62 and the lower fabric material 63 projects forward, in other words toward the driver, tends to increase. The characteristics of the function for holding the driver can be improved by limiting the distance D between the auxiliary bag material 120 and the upper end of the air bag 61 within the range $0 \leq D \leq H/2$, wherein H represents the distance by which the bag-shaped expanded portion projects.

Furthermore, according to any one of the embodiments described above, the upper fabric material and the lower fabric material are nearly identical in size and shape, which is circular, and sewed together along the circumferential edge. However, the invention is not limited to such a configuration, and the upper fabric material and the lower fabric material may have different shapes and/or sizes. For example, the lower fabric material have a circular shape which is larger than the upper fabric material.

Although the invention is explained referring to the above embodiments, which concern an air bag device to be attached to a steering wheel, the invention is applicable to various air bag devices, such as an air bag device adapted to be incorporated in an instrument panel so as to be used for a passenger seat, a side-protection air bag device adapted to be incorporated in a door panel, or an air bag device to be attached to the back of a front seat so as to be used for a rear seat.

INDUSTRIAL APPLICABILITY

As described above, the present invention can be used for an air bag device which may be attached to or incorporated in the steering wheel, the instrument panel or any other appropriate components of a vehicle in order to protect the occupant from a shock of a collision.

We claim:

1. An air bag device comprising:

an attachment structure including an attachment base;

an opening in said attachment base;

an inflator for ejecting gas;

an extending part of said inflator extending through said opening;

a retainer mounted on said attachment base and fastened thereto;

a pouch shaped air bag;

a lower part of said air bag having an attachment portion thereon;

said attachment portion including a gas inlet opening;

said lower part of said air bag being disposed intermediate said attachment base and said retainer;

said gas inlet opening positioned for passage of said extending part of said inflator extending into an inside space of said air bag whereby gas ejected therefrom expands said air bag;

means for fastening an attachment portion of an upper part of said air bag against said retainer, whereby, upon inflation of said air bag, an upper inflated section and a lower inflated section meet at said means;

an expanded upper part on a top portion of said retainer; and a fastener passing through said upper portion and secured to a top of said retainer expanded upper part.

2. An air bag device in accordance with claim 1 in which the fastener is a screw fastener.

3. An air bag device in accordance with claim 1 in which the retainer expanded upper part includes gas openings.

4. An air bag device in accordance with claim 3 in which the retainer expanded upper part gas openings are arrayed in the said upper part as a circle of openings.

* * * * *